United States Patent
Mizutani et al.

(10) Patent No.: US 7,676,127 B2
(45) Date of Patent: Mar. 9, 2010

(54) OPTICAL COMMUNICATION SYSTEM USING WDMA AND CDMA

(75) Inventors: Masahiko Mizutani, Yokohama (JP); Toshiki Sugawara, Kokubunji (JP); Tohru Kazawa, Kokubunji (JP); Yoshihiro Ashi, Yokohama (JP)

(73) Assignee: Hitachi Communication Technologies, Ltd., Tokyo (JP)

( * ) Notice: Subject to any disclaimer, the term of this patent is extended or adjusted under 35 U.S.C. 154(b) by 333 days.

(21) Appl. No.: 11/858,566

(22) Filed: Sep. 20, 2007

(65) Prior Publication Data

US 2008/0304828 A1   Dec. 11, 2008

(30) Foreign Application Priority Data

Jun. 7, 2007   (JP) .............................. 2007-151846

(51) Int. Cl.
*G02B 6/28*   (2006.01)
(52) U.S. Cl. .............................. 385/24; 385/15; 398/43; 398/77; 398/78
(58) Field of Classification Search .................. 385/15, 385/24; 398/43, 77, 78
See application file for complete search history.

(56) References Cited

U.S. PATENT DOCUMENTS 4,335,463 A * 6/1982 Foucard ...................... 375/141
7,274,441 B2 * 9/2007 Payton ....................... 356/73.1

OTHER PUBLICATIONS

IEEE 802.3ah CSMA/CD Access Method and Physical Layer Specifications Amendment: Media Access Control Parameters, Physical Layers, and Management Parameters for Subscriber Access Networks, (2005).
G.984.1 (Mar. 2003), Gigabit-capable Passive Optical Networks (GPON): General Characteristics.
G.984.2 (Mar. 2003)Gigabit-capable Passive Optical Networks (GPON):Physical Media Dependent (PMD) layer specification and Amendment 1 (Feb. 2006).
G.984.3 (Feb. 2004) Gigabit-capable Passive Optical Networks (G-PON): Transmission convergence layer specification, Amendment 1 (Jul. 2005) and Amendment 2 ( Mar. 2006) and Amendment 3 (Dec. 2006).

* cited by examiner

*Primary Examiner*—Jennifer Doan
(74) *Attorney, Agent, or Firm*—Mattingly & Malur, P.C.

(57) ABSTRACT

In a PON system, an OLT periodically transmits a channel resource information block specifying a carrier wavelength and a spreading code on a first downstream channel to which a spread-spectrum spreader having a first spreading code is applied; one of ONUs receives the channel resource information block with a spread-spectrum despreader having the first spreading code and transmits a connection request to the OLT, using the carrier wavelength and the spreading code specified by the channel resource information block; the OLT having received the connection request transmits a new channel resource information block specifying a carrier wavelength and a spreading code to be used on an upstream data channel to the requester ONU through the first channel; and the requester ONU transmits data, using the carrier wavelength and the spreading code specified by the new channel resource information block.

13 Claims, 14 Drawing Sheets

FIG. 4A

FLOW ID TABLE 251

| FLOW ID (VID) | SPREADING CODE (SPREADER ID) |
|---|---|
| VID (1) | Code 1 |
| VID (2) | Code 2 |
| ⋮ | ⋮ |

FIG. 4B

WAVELENGTH ALLOCATION TABLE 252

| SPREADING CODE NUMBER | CARRIER WAVELENGTH (OPTICAL TRANSMITTER ID) |
|---|---|
| Code 1 | $\lambda 1$ |
| Code 2 | $\lambda 2$ |
| ⋮ | ⋮ |

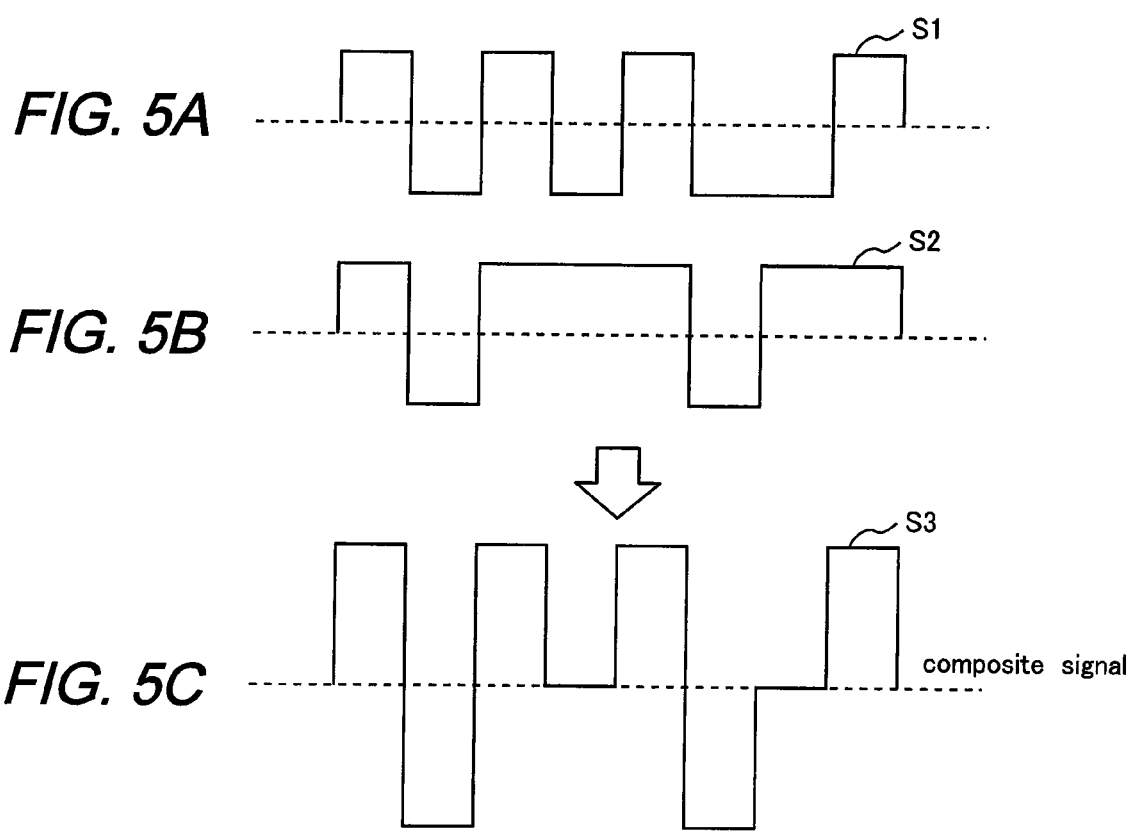

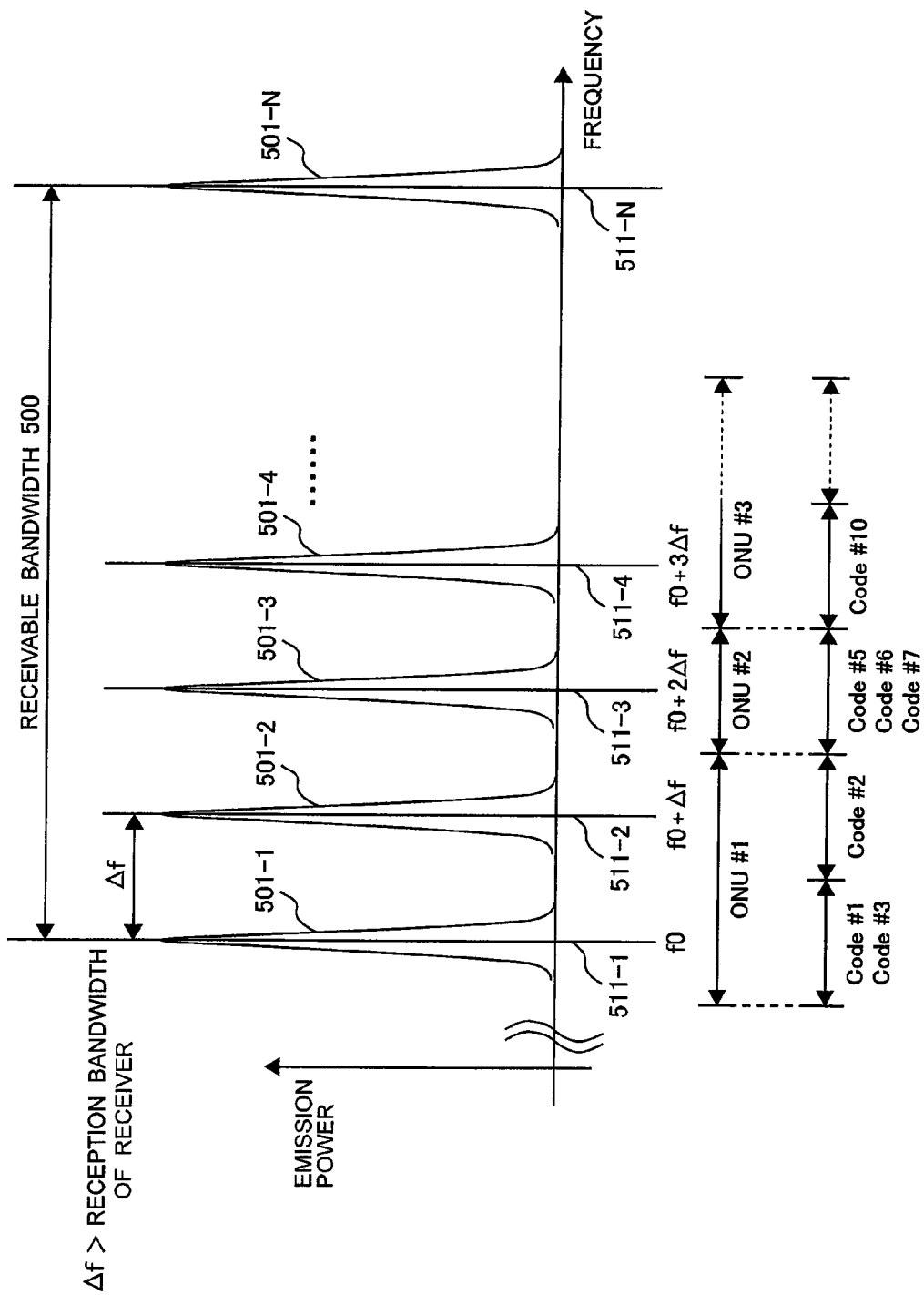

FLOW ID TABLE 151

| FLOW ID (VID) | SPREADING CODE (SPREADER ID) | ONU-ID |
|---|---|---|
| VID (1) | Code 1 | ONU (1) |
| VID (2) | Code 2 | ONU (2) |
| ⋮ | ⋮ | ⋮ |

ONU-UIF 20U

WAVELENGTH MANAGEMENT TABLE 253

| OPTICAL TRANSMITTER ID 2531 | WAVELENGTH (CARRIER FREQUENCY) 2532 | TARGET TEMPERATURE 2533 |
|---|---|---|
| 1 | λ1 | T(1) |
| 2 | λ2 | T(2) |
| ⋮ | ⋮ | ⋮ |

OPTICAL COMMUNICATION SYSTEM USING WDMA AND CDMA

CLAIM OF PRIORITY

The present application claims priority from Japanese application Ser. No. 2007-151846, filed on Jun. 7, 2007, the content of which is hereby incorporated by reference into this application.

BACKGROUND OF THE INVENTION (1) Field of the Invention

The present invention relates to an optical communication system, and more particularly, to an optical communication system using wavelength division multiple access (WDMA) and code division multiple access (CDMA) in an optical fiber section.

(2) Description of the Related Art

Services on a communication network have become increasingly diversified, and new services taking advantage of the network have been expanding. A representative example thereof is the integration of broadcasting and communication services such as so-called triple-play service for integrating broadcasting, internet and telephone (audio communication) services. This is a representative application of existing information services. The triple play is a keyword indicating a next generation network accommodating diversified information communication services.

Under this circumstance, FTTH construction with a passive optical network (PON) is in the mainstream in an access network. A PON system is comprised of an office side line terminal apparatus OLT (Optical Line Terminal) disposed in a station building of a communication carrier and a plurality of subscriber connection apparatuses ONU (Optical Network Unit) each disposed in a user's home. In the PON system, a single optical fiber (trunk optical fiber) is laid from the OLT to a service area, the trunk optical fiber is branched by a splitter into a plurality of branch optical fibers and ONUs are connected to the respective branch optical fibers, thereby to distribute signals to each user's home in a point-to-multipoint manner.

Since the PON system has a signal multicast function by optical branching, it is effective as an infrastructure for distributing a large amount of data such as a high-resolution image. Further, since a plurality of ONUs can share a trunk optical fiber, the PON system is advantageous in reducing the cost of laying optical fibers and the number of transmitting and receiving devices on the OLT side, compared to a star network for connecting a station building with user's homes in a point-to-point manner.

The current PON system includes ITU-T G(Gigabit-capable)-PON and IEEE GE(Gigabit-Ethernet)-PON. Details of G-PON are defined, for example, in ITU-T G.984.1 "Gigabit-capable Passive Optical Networks (GPON): General characteristics", ITU-T G.984.2 "Gigabit-capable Passive Optical Networks (GPON): Physical Media Dependent (PMD) layer specification", and ITU-T G.984.3 "Gigabit-capable Passive Optical Networks (GPON): Transmission convergence layer specification") and details of GE(Gigabit-Ethernet)-PON are defined in IEEE 802.3ah "CSMA/CD Access Method and Physical Layer Specifications Amendment: Media Access Control Parameters, Physical Layers, and Management Parameters for Subscriber Access Networks."

While attention is being given to the development of the integrated services of broadcasting and communication, enhancement of communication density (higher multiplexing), enhancement of communication speed (higher bit rate), and expansion of fiber laid areas are required for the PON system in order to distribute high-resolution images, for example, on high-definition television, to a larger number of users. PON-related standardizing organizations (ITU-T and IEEE) have started to study next-generation PONs subsequent to the current PON system.

Currently, in such standardization conferences, 10GE-PON and WDM-PON are proposed as next-generation PONs. As the multiplexing of the next-generation PON, time division multiple access (TDMA) is in the mainstream, as in the case of the current PON. Further, the application of code division multiple access (CDMA) is under study as another multiplexing method. Since CDMA can transmit and receive a plurality of flows with a same carrier wave at a same time, and it is not necessary to adjust communication timing among ONUs and provide a guard time between frames, CDMA has an advantage that information transmission efficiency with respect to transmission bandwidth is higher than that of TDMA. Further, in CDMA, transmission data is protected by spread spectrum with orthogonal spreading codes, therefore, in the PON system in which multiple users are accommodated on a same optical fiber, the effect of enhancing the confidentiality of information can also be expected.

SUMMARY OF THE INVENTION

In optical CDMA, when a plurality of communication devices transmit CDMA signals with carrier waves (laser beams) of a same wavelength on a same optical fiber, mutual interference occurs between transmission signals. If two optical transmission signals in completely opposite phase exist on an optical fiber, the optical signals are canceled out by mutual interference, so that signal strength on the receiving side becomes zero, and transmission information is completely lost (homodyne interference). Even if carrier waves of different wavelengths are used, an insufficient wavelength difference between the carrier waves causes mutual interference between transmission signals. This mutual interference is called beat noise (heterodyne interference).

The homodyne interference and the heterodyne interference also occur in CDMA mobile wireless communication. However, in the case of the mobile wireless communication, the positional relationship between a base station and a mobile terminal varies temporally. Accordingly, even if the above-mentioned mutual interference occurs between transmission signals, its influence is momentary and is not so large as that of noise level of a transmission medium and multipath effect.

In an optical access network such as PON, the positional relationship between the OLT and each ONU is fixed, and a transmitting device transmits a signal with a stable laser beam. Accordingly, if the above-mentioned interference occurs on an optical fiber, its influence may continue for a long time.

It is an object of the present invention to provide an optical communication system which enables highly multiplexed signal transmission without having mutual interference on an optical fiber between transmission signals.

It is another object of the invention to provide a PON-based optical communication system which enables highly multiplexed signal transmission, applying code division multiple access.

In order to attain the above objects, in an optical communication system according to the invention, CDMA signals transmitted from a plurality of ONUs are multiplexed on an optical fiber by WDMA, and a carrier wavelength (laser wavelength) different for each ONU is used to prevent signal deterioration due to mutual interference among laser beams. Further, a carrier wavelength and a spreading code to be used are assigned to each ONU from an OLT. The assignment of the carrier wavelength is performed within an optical frequency bandwidth (wavelength range) that can be received by an optical signal receiving device in the OLT. In order to prevent the receiving device from detecting an interference component, the spacing between adjacent carrier wavelengths is determined so as to be larger than the frequency bandwidth of CDMA signals.

More specifically, an optical communication system according to the invention comprises a plurality of first apparatuses connected to branch optical fibers branching from a trunk optical fiber and a second apparatus connected to the trunk optical fiber. Each of the first apparatuses includes a plurality of spread-spectrum spreaders having different spreading codes, at least one optical signal transmitter for transmitting to one of the branch optical fibers a CDMA signal generated by spread spectrum by each of the spread-spectrum spreader as an optical CDMA signal having a carrier wavelength different from carrier wavelengths of the other first apparatuses, and a first controller. The second apparatus includes an optical signal receiver for receiving a wavelength-division-multiplexed optical CDMA signal through the trunk optical fiber, a plurality of spread-spectrum despreaders having different spreading codes to each other and connected to the optical signal receiver, and a second controller for managing a wavelength and a spreading code to be used for each of the first apparatuses. The second controller specifies, in response to a request from each of the first controllers, a transmission timing and a wavelength and a spreading code different from that of the other first apparatuses. Each of the first apparatuses spreads transmission data with a spread-spectrum spreader having the specified spreading code, converts the spread data into an optical signal having the specified wavelength and transmits the optical signal to the branch optical fiber at the specified transmission timing by the optical signal receiver.

A PON system according to the invention includes an office side line terminal apparatus (OLT) connected to a trunk optical fiber and a plurality of subscriber connection apparatuses (ONU) each connected to one of branch optical fibers branching from the trunk optical fiber.

Each ONU comprises an ONU upstream interface and an ONU downstream interface which are connected to one of the branch optical fibers, and an ONU controller connected to the ONU upstream interface and the ONU downstream interface, the ONU upstream interface including a plurality of spread-spectrum spreaders having different spreading codes and at least one optical signal transmitter for transmitting to the branch optical fiber a CDMA signal outputted from one of the spread-spectrum spreaders as an optical CDMA signal having a carrier wavelength specified by the OLT, the ONU downstream interface including an optical signal receiver for receiving an optical CDMA signal through the branch optical fiber and a plurality of spread-spectrum despreaders connected to the optical signal receiver and having different spreading codes.

The OLT comprises an OLT upstream interface and an OLT downstream interface which are connected to the trunk optical fiber, and an OLT controller connected to the OLT upstream interface and the OLT downstream interface, the OLT upstream interface including an optical signal receiver for receiving a wavelength-division-multiplexed optical CDMA signal through the trunk optical fiber, and a plurality of spread-spectrum despreaders connected to the optical signal receiver and having different spreading codes, the OLT downstream interface including a plurality of spread-spectrum spreaders having different spreading codes to each other, and at least one optical signal transmitter for transmitting to the trunk optical fiber a CDMA signal outputted from one of the spread-spectrum spreaders as an optical CDMA signal.

The OLT controller periodically transmits a channel resource information block specifying a carrier wavelength and a spreading code on a first downstream channel to which a spread-spectrum spreader having a first spreading code is applied, and any one of ONU controllers having received the channel resource information block with a spread-spectrum despreader having the first spreading code transmits a connection request to the OLT, using the carrier wavelength and the spreading code specified by the channel resource information block. The OLT controller receives the connection request with a spread-spectrum despreader having the spreading code specified in the channel resource information block, and transmits on the first channel a new channel resource information block specifying a carrier wavelength and a spreading code for an upstream data channel to the ONU having made the request, and the ONU controller that has made the request transmits data, using the carrier wavelength and the spreading code specified by the new channel resource information block which was addressed thereto and received by the spread-spectrum despreader having the first spreading code.

In the PON system according to the invention, the OLT controller periodically transmits a synchronization frame having a fixed pattern (synchronization detection pattern) corresponding to a second spreading code at a leading part, and the ONU controller detects, by receiving the synchronization frame with a spread-spectrum despreader having the second spreading code, a spreading code generation timing at which a chip pattern of the second spreading code to be applied to the spread-spectrum despreader is synchronized with the fixed pattern, and receives the channel resource information block in a state where each spreading code to be applied to each of the spread-spectrum despreaders of the ONU downstream interface is synchronized with the spreading code generation timing.

According to one aspect of the invention, the OLT controller periodically transmits a channel resource information block specifying a carrier wavelength, a spreading code, and a transmission timing on the first downstream channel, and the ONU controller transmits a connection request to the OLT at the transmission timing specified by the channel resource information block, using the carrier wavelength and the spreading code specified by the channel resource information block.

According to another aspect of the invention, the OLT controller periodically transmits a channel resource information block specifying a carrier wavelength, a spreading code, and a plurality of transmission timings on the first downstream channel, and the ONU controller transmits a connection request to the OLT at a transmission timing randomly selected from the plurality of transmission timings, using the carrier wavelength and the spreading code specified by the channel resource information block.

According to another aspect of the invention, the OLT controller periodically transmits a plurality of channel resource information blocks each specifying a carrier wavelength, a spreading code, and a transmission timing on the first downstream channel, and the ONU controller selects one of the channel resource information blocks, and transmits a connection request to the OLT at the transmission timing specified by the channel resource information block, using the carrier wavelength and the spreading code specified by the channel resource information block.

According to another aspect of the invention, the ONU controller specifies a desired bandwidth with the connection request, and the OLT controller transmits a channel resource information block specifying a carrier wavelength, a spreading code, and an allocated bandwidth to the ONU that has made the request.

According to the invention, with the combined use of optical CDMA and the principles of WDMA, it is possible to avoid the interference between light waves (influence of beat noise) which is an obstacle to the practical use of optical CDMA. Further, with the assignment of appropriate resources at ONU startup in the PON system, each ONU can effectively use the transmission capacity of the optical fiber to start data transmission.

BRIEF DESCRIPTION OF THE DRAWINGS

These and other features, objects and advantages of the present invention will become more apparent from the following description when taken in conjunction with the accompanying drawings wherein:

FIG. 4A and FIG. 4B are diagrams showing a flow ID table 251 and a wavelength allocation table 252, respectively, each provided in a controller 250 of the ONU-UIF 20U;

FIGS. 5A and 5B are diagrams showing spread signals inputted to a multiplexer 220 in the ONU-UIF 20U, and FIG. 5C is a diagram showing a multilevel rectangular wave generated by performing linear addition processing on these spread signals;

FIG. 6 is a graph showing the assignment of carrier frequencies to ONUs and flow IDs;

DETAILED DESCRIPTION OF THE PREFERRED EMBODIMENTS

Figure 1:
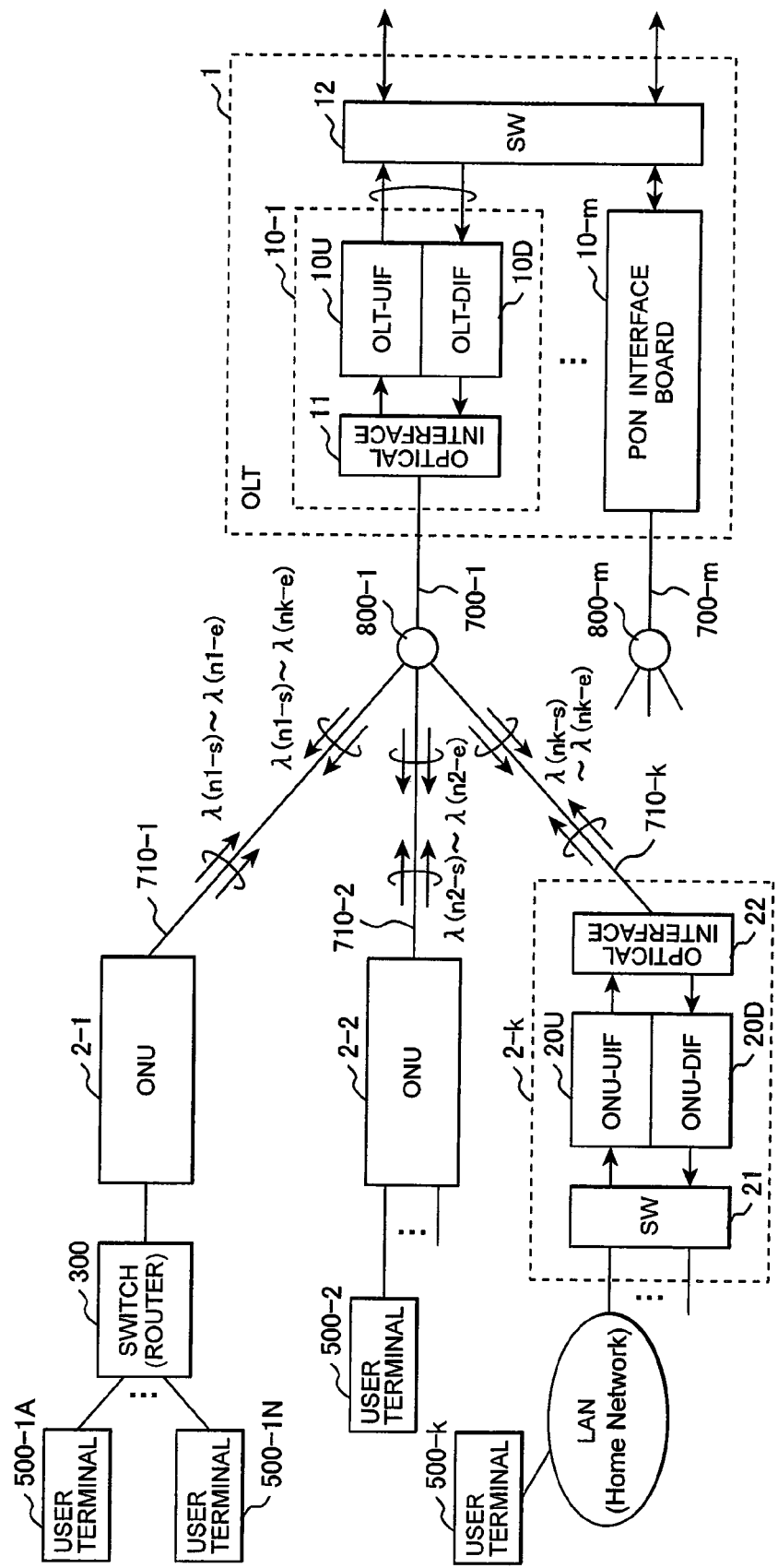
FIG. 1 is a diagram showing the configuration of a PON system to which the present invention is applied and carrier frequencies in an optical fiber section.

FIG. 1 shows the configuration of a PON system to which optical CDMA according to the present invention is applied and carrier wavelengths (carrier frequencies) in an optical fiber section.

The PON system is comprised of an office side line terminal apparatus OLT (Optical Line Terminal) 1 and a plurality of subscriber connection apparatuses ONU (Optical Network Unit) 2 (2-1 to 2-k) connected to the OLT 1 via an optical fiber network. The optical fiber network is composed of trunk optical fibers 700 (700-1 to 700-m) connected to the OLT 1 and a plurality of branch optical fibers 710 (710-1 to 710-k) connected to a trunk optical fiber 700 through an optical splitter (optical coupler) 800 (800-1 to 800-m). Each ONU 2 is connected to one of the branch optical fibers 710, and a plurality of ONUs share the trunk optical fiber 700 to communicate with the OLT 1.

One or a plurality of user terminals 500 are connected to each ONU 2. User terminals 500 are connected to the ONU 2 in a variety of manners. For example, as shown in FIG. 1, a user terminal 500-2 is connected to the ONU through an individual subscriber line, user terminals 500-1A to 500-1N are connected through a home switch or home router 300, and a user terminal 500-k is connected through a home network (LAN) 400. In the description below, the user terminal 500 refers not only to a PC for private use in an ordinary household, but also to a PC and a server for business use in a company.

As shown in the ONU 2-k for example, each ONU 2 is composed of a switch 21 which accommodates connection lines for user terminals, an optical interface 22 connected to the branch optical fiber 710, and an ONU upstream interface board (hereinafter referred to as "ONU-UIF") 20U and an ONU downstream interface board (hereinafter referred to as "ONU-DIF") 20D which are connected between the switch 21 and the optical interface 22.

The ONU-UIF 20U is an interface board which handles upstream data transmitted from a user terminal and headed for a wide area network through the OLT 1, and the ONU-DIF 20D is an interface board which handles downstream data headed for a user terminal from a wide area network through the OLT 1. Each ONU 2 includes an ONU controller (not shown) connected to the ONU-UIF 20U and the ONU-DIF 20D.

The OLT 1 is composed of a plurality of PON interface boards (hereinafter referred to as "PON-IFB") 10 (10-1 to 10-m) which accommodate the respective trunk optical fibers 700 (700-1 to 700-m) and a switch (or router) 12 connected to the PON-IFBs 10.

A PON-IFB 10 is composed of an optical interface 11 connected to the trunk optical fiber 700, and an OLT upstream interface board (hereinafter referred to as "OLT-UIF") 10U and an OLT downstream interface board (hereinafter referred to as "OLT-DIF") 10D which are connected between the optical interface 11 and the switch 12. Each PON-IFB 10 includes an OLT controller (not shown) connected to the OLT-UIF 10U and the OLT-DIF 10D.

An ISP (Internet Service Provider) network and an access network (regional IP network) headed for a wide area network are connected to the switch (or router) 12. The switch 12 may accommodate a relay network connected to individual sites of companies and the like. In this embodiment, the switch 12 is composed of a layer 2 switch. In this case, the function of the switch 12 varies depending on the standard of the PON system and the type of transmission data. For example, in the case where an upstream reception frame is an Ethernet frame as in the PON system of IEEE 802.3ah "CSMA/CD Access Method and Physical Layer Specifications Amendment: Media Access Control Parameters, Physical Layers, and Management Parameters for Subscriber Access Networks", the switch 12 performs header information processing of the reception frame and transfers the resultant frame to a transmission channel. In the case where an upstream reception frame is a TDM (Time Division Multiplexing) frame as in the G-PON described in ITU-T G.984.1 "Gigabit-capable Passive Optical Networks (GPON): General characteristics", ITU-T G.984.2 "Gigabit-capable Passive Optical Networks (GPON): Physical Media Dependent (PMD) layer specification", and ITU-T G.984.3 "Gigabit-capable Passive Optical Networks (GPON): Transmission convergence layer specification", the switch 12 encapsulates the reception frame into an Ethernet frame and transfers the Ethernet frame to a transmission channel.

The switch 12 can have the function of controlling a bandwidth for each flow concerning a downstream frame and an upstream frame. Further, at the position of the switch 12, it is possible to introduce the protocol processing of OSI layer 3 and the processing of a high-quality layer including MLD (Multicast Listener Discovery) proxy and IGMP (Internet Group Management Protocol) proxy in cooperation with firmware. However, since the invention is directed to signal multiplexing on the optical fibers for connecting the ONUs and the OLT, a detailed description as to the function of the switch 12 is omitted here. In the embodiment below, it is assumed that, for example, Ethernet® is applied as the protocol of a physical layer to a transmission layer on the subscriber line (UNI: User Network Interface) side of the ONU 2.

As shown in FIG. 1, the ONU 2-1 transmits a CDMA upstream signal on a carrier wave having a wavelength range of $\lambda$(n1-s) to $\lambda$(n1-e) through the branch optical fiber 710-1, the ONU 2-2 transmits a CDMA upstream signal on a carrier wave having a wavelength range of $\lambda$(n2-s) to $\lambda$(n2-e) through the branch optical fiber 710-2, and the ONU 2-$k$ transmits a CDMA upstream signal on a carrier wave having a wavelength range of $\lambda$(nk-s) to $\lambda$(nk-e) through the branch optical fiber 710-$k$. These carrier waves are wavelength-multiplexed on the trunk optical fiber 700 and sent to the OLT 1. Further, the OLT 1 transmits CDMA downstream signals on carrier waves having a wavelength range of $\lambda$(n1-s) to $\lambda$(nk-e), and these downstream signals are broadcasted to the branch optical fibers 710 through the trunk optical fiber 700. Since downstream optical CDMA signals are sent from one sender (OLT 1), there is no possibility of crosstalk as among upstream signals; therefore, they may be transmitted by one carrier wavelength.

The wavelength ranges of $\lambda$(n1-s) to $\lambda$(n1-e), $\lambda$(n2-s) to $\lambda$(n2-e), and $\lambda$(nk-s) to $\lambda$(nk-e) merely illustrate that a different carrier wavelength is applied to each branch optical fiber. Each ONU 2 transmits upstream data, using a carrier wavelength and a spreading code specified by the OLT 1. Each ONU 2 may use a plurality of carrier wavelengths (carrier frequencies) or one carrier wavelength.

Figure 2:
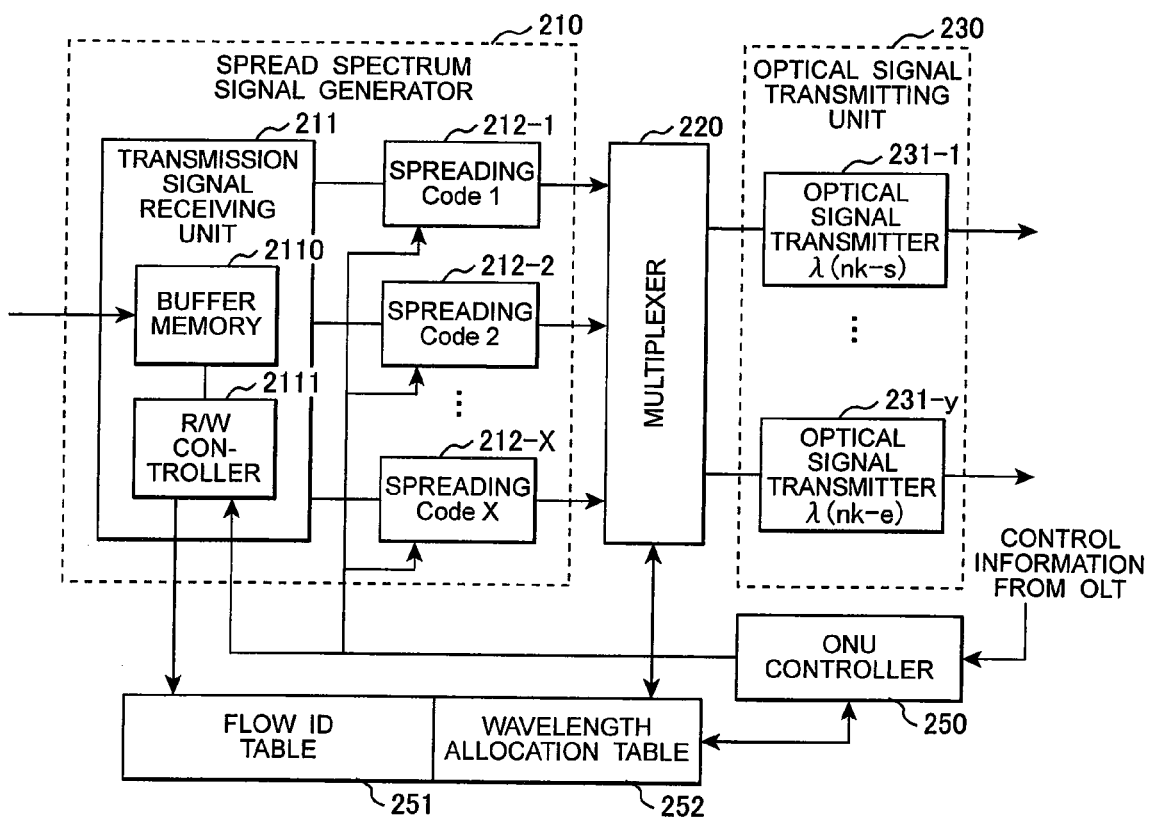
FIG. 2 is a diagram showing a configuration example of an upstream interface board (ONU-UIF) 20U included in an ONU 2 in FIG. 1.

FIG. 2 shows a configuration example of the upstream interface board (ONU-UIF) 20U in the ONU 2 (2-1 to 2-$k$).

The ONU-UIF 20U includes a spread spectrum signal generator 210, a multiplexer 220, an optical signal transmitting unit 230, and an ONU controller 250. The ONU controller 250 is provided with a flow ID table 251 for indicating the correspondence relationship between a flow identifier (flow ID) 2511 and a spreading code number (spreader ID) 2512 as shown in FIG. 4A and a wavelength allocation table 252 for indicating the correspondence relationship between a spreading code number (spreader ID) 2521 and a carrier wavelength (optical transmitter ID) 2522 as shown in FIG. 4B. In order to save memory capacity, the flow ID table 251 and the wavelength allocation table 252 may be combined into one table which indicates the correspondence relationship among the flow identifier 2511, the spreading code number 2512 (2521), and the carrier wavelength 2522.

The optical signal transmitting unit 230 is composed of a plurality of optical signal transmitters 231 (231-1 to 231-$y$) having different carrier wavelengths (laser wavelengths) identified by the optical transmitter ID 2522 in the wavelength allocation table 252. In the embodiment below, when the spreading code number 2521 to be applied to a transmission frame is identified by the flow ID table 251, the carrier wavelength of the transmission frame is determined by the wavelength allocation table 252, thus identifying an optical signal transmitter for converting a CDMA spread signal into an optical signal.

The spread spectrum signal generator 210 is composed of a transmission signal receiving unit 211 connected to the switch 21 and a plurality of spread-spectrum spreaders 212 (212-1 to 212-$x$) connected to the transmission signal receiving unit 211. The transmission signal receiving unit 211 includes a buffer memory 2110 and an R/W controller 2111. Upon receiving an Ethernet frame from each terminal through the switch 21, the R/W controller 2111 temporarily stores the reception frame in the buffer memory 2110. Then, the R/W controller 2111 extracts a VLAN-ID (hereinafter referred to as "VID") from the header of the reception frame, retrieves a spreading code number j corresponding to the VID from the flow ID table 251, and distributes the reception frame to a spread-spectrum spreader 212-$j$ corresponding to the spreading code number j. The VID may be a user ID of the frame sender or a service ID of the frame.

The R/W controller 2111 is connected to the ONU controller 250, and sends the reception frame to the spread-spectrum spreader 212-$j$ at a predetermined timing specified by the OLT 1. The spread-spectrum spreader 212-$j$ spreads the reception frame (Ethernet frame) having a symbol rate with a spreading code and thus converts the reception frame into a high-speed spread spectrum signal having the chip rate of the spreading code, which is then outputted to the multiplexer 220. The spread-spectrum spreader 212-1 to 212-$x$ are synchronized with each other and convert a reception frame into a spread spectrum signal with respective unique spreading codes.

In accordance with the wavelength allocation table 252, the multiplexer 220 selectively supplies each spread signal outputted from the spread-spectrum spreaders 212-1 to 212-$x$ to any one of the optical signal transmitters 231-1 to 231-$y$. In the case where the optical signal transmitting unit 230 includes only one effective optical signal transmitter, all spread signals outputted from the spread-spectrum spreaders 212-1 to 212-$x$ are transmitted by one carrier wave.

In the case where the optical signal transmitting unit 230 includes a plurality of optical signal transmitters 231-1 to 231-$y$, lasers having different oscillation wavelengths are used in these optical signal transmitters. In the case of multiplexing a plurality of spread signals on a specific carrier wave, the multiplexer 220 performs linear addition on the plurality of spread signals to convert them into a multilevel rectangular wave, and supplies it to an optical signal transmitter. In this case, in order to accurately transmit a signal subjected to linear addition, the spreading codes used by the spread-spectrum spreaders are in clock synchronization with each other.

In FIG. 1, a different carrier wave range is allocated to each ONU. In the carrier wavelength ranges of λ(n1-s) to λ(n1-e), λ(n2-s) to λ(n2-e), and λ(nk-s) to λ(nk-e), CDMA spread signals are wavelength-division-multiplexed by the ONU 2-1, the ONU 2-2, and the ONU 2-k, respectively. Similarly, a different spreading code range is assigned to each ONU. In the case where a tunable optical signal transmitter is used in the ONU, the OLT 1 can allocate an arbitrary wavelength to each ONU.

Figure 3:
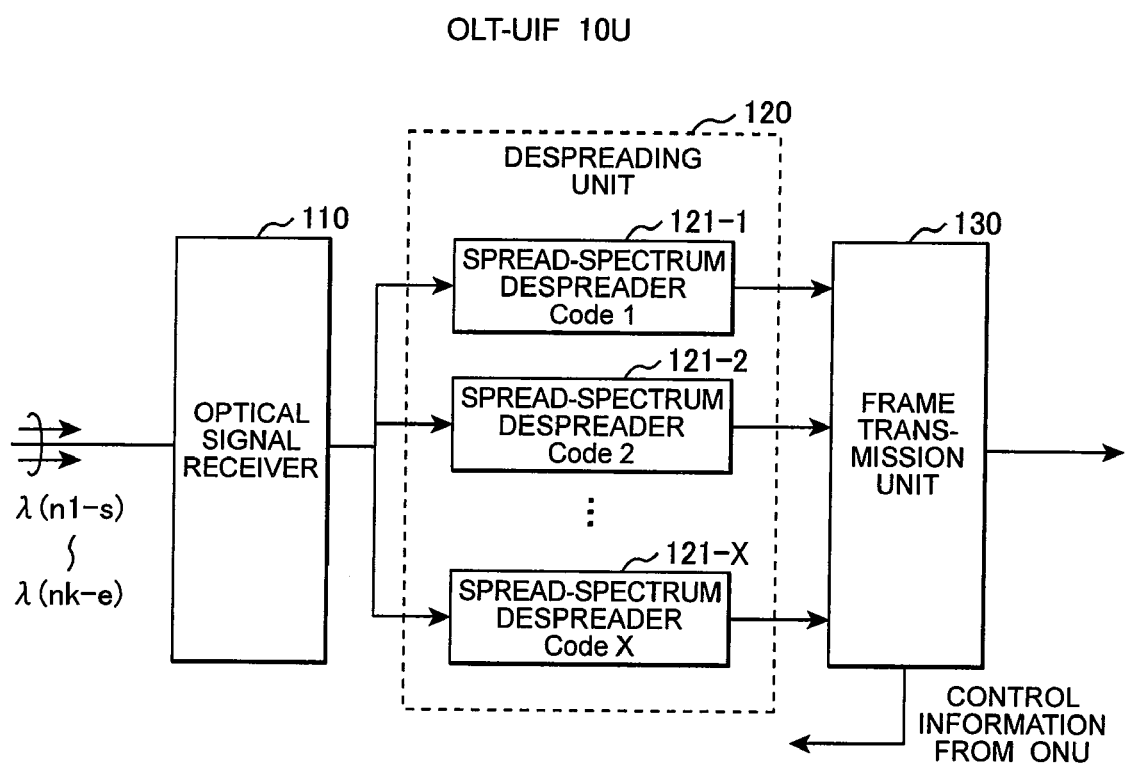
FIG. 3 is a diagram showing a configuration example of an upstream interface board (OLT-UIF) 10U included in an OLT 1 in FIG. 1.

FIG. 3 shows a configuration example of the OLT-UIF 10U.

The OLT-UIF 10U is composed of an optical signal receiver (O/E converter) 110, a despreading unit 120, and a frame transmission unit 130. A CDMA spread signal wavelength-division-multiplexed on the trunk optical fiber 700 is inputted to the optical signal receiver 110 through the optical interface 11. The optical signal receiver 110 converts a received optical signal into an electrical signal, and outputs to the despreading unit 120 a multilevel rectangular wave signal generated by performing linear addition on all spread signals in the received optical signal. In this embodiment, the optical signal receiver 110 is composed of one optical signal receiving device that can convert an optical CDMA signal into an electrical signal in the carrier frequency range of λ(n1-s) to λ(nk-e).

The despreading unit 120 is composed of a plurality of spread-spectrum despreaders 121 (121-1 to 121-x) having different spreading codes to be applied. Each spread-spectrum despreader 121 has a unique spreading code (Code 1 to Code x), and performs despreading on a multilevel rectangular wave outputted from the optical signal receiver 110. The despreading refers to the correlation detection between a reception signal and a spreading code. For example, the spread-spectrum despreader 121-1 is composed of the matched filter of an input signal and code 1. The spread-spectrum despreader 121-1 shows a high correlation with a signal component spread with spreading code 1 and weakens, by despreading, the signal strength of signal components spread with the other codes. Then, the output of the matched filter is integrated over the code period of the chip rate, thus reproducing data of a symbol rate spread with code 1 on the transmitting side.

Figure 7:
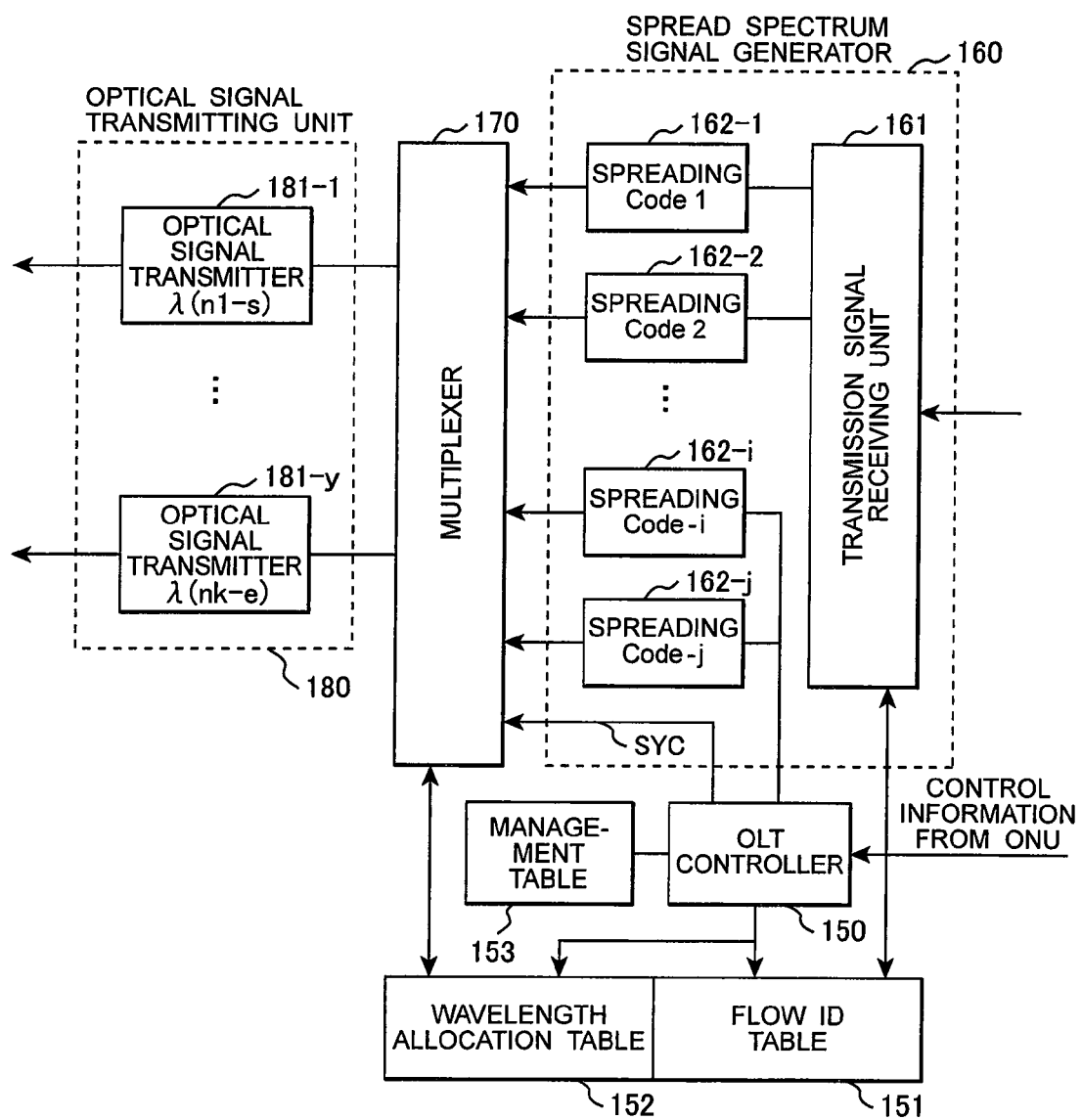
FIG. 7 is a diagram showing a configuration example of a downstream interface board (OLT-DIF) 10D included in the OLT 1.

After performing header processing as necessary on each reception frame outputted at a symbol rate from the despreading unit 120, the frame transmission unit 130 transfers a user frame to the switch 12 and transfers a control frame sent from the ONU to an OLT controller 150 shown in FIG. 7. The header processing includes, for example, addition of a VLAN tag or an MPLS label, header conversion, and partial deletion of header information. The frame transmission unit 130 may have a bandwidth control function so as to perform bandwidth control for each flow on a reception frame and output it to the switch 12.

FIGS. 5A and 5B show spread signals inputted to the multiplexer 220 in the ONU-UIF 20U, and FIG. 5C shows a multilevel rectangular wave generated by performing linear addition processing on these spread signals.

FIGS. 5A and 5B show signals S1 and S2 of chip rates spread with different spreading codes. In a state where the clock timings of two spread-spectrum spreaders outputting the signals S1 and S2 are in synchronization with each other, the linear addition of the signals S1 and S2 generates a multilevel rectangular wave signal S3 as shown in FIG. 5C. In the case where the signals S1 and S2 are transmitted on a same carrier wave, the multiplexer 220 converts the signals S1 and S2 into the signal S3 and supplies it to the optical signal transmitter, and the optical signal transmitter converts the signal into an optical signal of a predetermined carrier wavelength, using the linearity of laser output signal strength.

The optical signal receiver 110 in the OLT-UIF 10U converts wavelength-division-multiplexed optical CDMA signals transmitted from the ONUs 2-1 to 2-k into an electrical signal. At this time, by clock-synchronizing with optical signals transmitted at a chip rate and converting the optical signals on a plurality of carrier waves into an electrical signal simultaneously, the output signal of the optical signal receiving device becomes a multilevel rectangular wave as shown in FIG. 5C. The spread-spectrum despreaders 121-1 to 121-x multiply the multilevel signal by spreading codes 1 to x, thus reconstructing data of a symbol rate corresponding to the spreading code.

In this embodiment, a usable carrier wavelength and spreading code in a range different for each ONU are assigned with the flow ID table 251 and the wavelength allocation table 252. Each ONU can freely associate a carrier wavelength with a spreading code. For example, each ONU may associate all spreading codes (spreading signals) with different carrier waves, or associate a plurality of spreading codes with a same carrier wave.

Applying a different spreading code to each ONU forms a plurality of logical carriers in the optical fiber section, so that the receiving side (OLT side) can identify a flow. Further, transmitting a spread signal using a different carrier wavelength for each ONU can suppress physical signal interference in the optical fiber section.

FIG. 6 shows the assignment of carrier wavelengths (carrier frequencies) to ONUs and flow IDs.

In this embodiment, a plurality of carrier waves (laser beams) 501-1 to 501-N having different peak frequencies 511-1 to 511-N are defined in an optical bandwidth 500 which can be received by the optical signal receiver 110 in the OLT-UIF 10U. The control of a laser frequency (wavelength) will be described later. In FIG. 6, the frequencies 511-1 to 511-N are arranged at fixed frequency intervals Δf.

The frequency interval Δf between adjacent laser beams is set to such a sufficient value that the laser beams do not interfere with each other on the branch optical fibers and the trunk optical fiber and the receiver does not detect an interference component (beat noise). More specifically, the frequency interval (wavelength interval) Δf is not less than a CDMA spread signal bandwidth that can be received by the optical signal receiver 110. For example, in the case of transmission of an optical CDMA signal having a chip rate of 10 Gbps, the frequency interval between adjacent wavelength lasers is 10 GHz or more.

The relationship between the spreading codes and the carrier waves (laser frequencies) assigned to the ONUs is shown in the lower part of FIG. 6. In FIG. 6, frequencies 511-1 and 511-2 as carrier waves (laser beams 501-1 and 501-2) are assigned to ONU #1, frequency 511-3 (laser beam 501-3) is assigned to ONU #2, and a plurality of frequencies (laser beams 501-4, . . . ) starting from frequency 511-4 are assigned to ONU #3. Further, spreading codes #1 and #3 used in ONU #1 are assigned to frequency 511-1, and spreading code #2 is assigned to frequency 511-2. Spreading codes #5 to #7 used in ONU #2 are assigned to a single frequency 511-3. In each ONU, the correspondence relationship between spreading codes and frequencies is stored in the wavelength allocation table 252 shown in FIG. 4B.

FIG. 7 shows a configuration example of the OLT downstream interface board (OLT-DIF) 10D.

The OLT-DIF 10D is composed of a spread spectrum signal generator 160, a multiplexer 170, and an optical signal transmitting unit 180. The spread spectrum signal generator 160 and the multiplexer 170 are connected to an OLT controller 150.

Figures 8, 9:
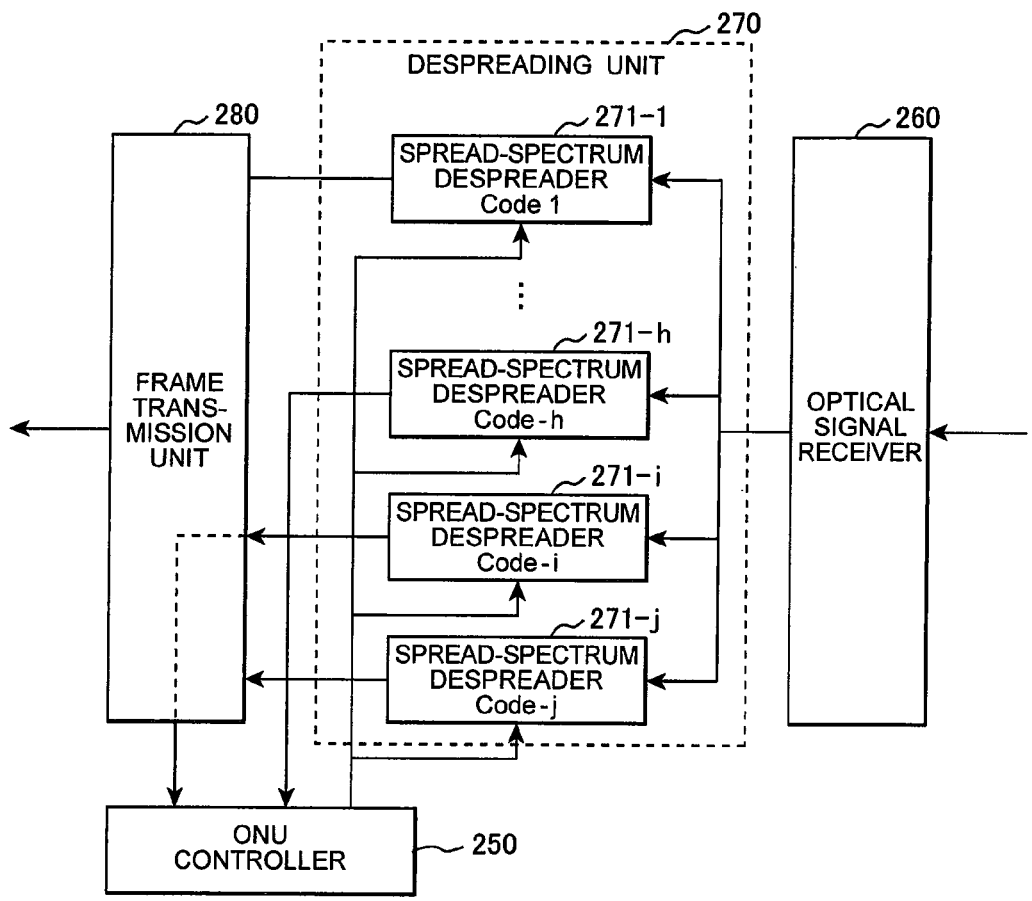
FIG. 8 is a diagram showing a configuration example of a downstream interface board (ONU-DIF) 20D included in the ONU 2.
FIG. 9 is a diagram showing the contents of a flow ID table 151 provided in a controller 150 of the OLT-DIF 10D.

The OLT controller 150 is provided with a flow ID table 151 and a wavelength allocation table 152. The flow ID table 151 indicates, for example as shown in FIG. 9, the correspondence relationship among a flow identifier (flow ID) 1511, a spreading code number (spreader ID) 1512, and an ONU identifier (ONU-ID) 1513. The wavelength allocation table 152 indicates the correspondence relationship between a spreading code number (spreader ID) and a carrier wavelength (optical transmitter ID), in like manner as the wavelength allocation table 252 shown in FIG. 4B. As described in the ONU-UIF 20U, the flow ID table 151 and the wavelength allocation table 152 may be combined into one table.

The optical signal transmitting unit 180 is composed of a plurality of optical signal transmitters (laser devices) 181 (181-1 to 181-*y*) having different oscillation frequencies (laser wavelengths λ). The interval between adjacent wavelengths of the optical signal transmitters is set to such a sufficient value that a plurality of laser beams do not interfere with each other on the optical fibers.

The spread spectrum signal generator 160 is composed of a transmission signal receiving unit 161 connected to the switch 12 and a plurality of spread-spectrum spreaders 162 (162-1 to 162-*j*). Upon receiving a downstream frame (Ethernet frame) from the switch 12, the transmission signal receiving unit 161 refers to the flow ID table 151, adds a header including an ONU identifier to the reception frame, and distributes it to an appropriate spread-spectrum spreader.

More specifically, the transmission signal receiving unit 161 extracts data flow identifier (flow ID) such as a user ID of a sender or a service ID from the header of the reception frame, retrieves a spreading code number i and an ONU identifier corresponding to the flow ID from the flow ID table 151, converts the reception frame into a packet having the ONU identifier, and transfers it to a spread-spectrum spreader 162-*x* identified by the spreading code number x. Adding the ONU identifier to the reception frame may be performed, for example, by referring to a dedicated routing table indicating the correspondence relationship between the header information of the reception frame and the ONU identifier which is the transfer destination of the frame. However, in a PON section, a plurality of packets are transmitted in the payload of a PON frame generated at a predetermined period. Accordingly, the transmission signal receiving unit 161 executes the transfer of the downstream frame to the spread-spectrum spreader 162-*x* at a timing according to the format of the PON frame.

The spread-spectrum spreader 162-*x* spreads each symbol of the reception frame with a spreading code having a chip rate faster than the symbol rate of the reception frame, thus converting the reception frame into a wideband spread spectrum signal. The spread signal is forwarded from the spread-spectrum spreader 162-*x* to the multiplexer 170. The multiplexer 170 distributes the spread signal supplied from the spread-spectrum spreader 162-*x* to an optical signal transmitter corresponding to the spreading code number i.

More specifically, the multiplexer 170 refers to the wavelength allocation table 152, identifies a carrier frequency (wavelength λ) corresponding to the spreading code number x, and supplies the spread signal to an optical signal transmitter (laser device) 181-*k* which oscillates at this frequency. In the case where the wavelength allocation table 152 associates a plurality of spreading codes with one carrier frequency, the multiplexer 170 performs liner addition on a plurality of spread-spectrum spreader outputs to be superposed on a same carrier wave and supplies the spread signal converted into a multilevel rectangular wave to an optical signal transmitter having the above mentioned carrier frequency. However, when the transmission signal receiving unit 161 sequentially receives downstream frames from the switch 12, since the downstream frames are sequentially distributed to spread-spectrum spreaders corresponding to flow Ids, the multiplexer 170 outputs two-level rectangular waves.

In the case where the OLT controller 150 transmits a control message to the ONUs 2 (2-1 to 2-*k*), a specific spread-spectrum spreader, e.g., a spread-spectrum spreader 162-*j* may be used as a control channel so that the spread-spectrum spreader 162-*j* spreads the control message which is then supplied to a specific optical signal transmitter through the multiplexer 170. In the description below, the OLT controller 150 uses a spread-spectrum spreader 162-1 as a resource information channel described later. The resource information channel is used to notify resource information on a communication start request sending channel to an ONU that has established synchronization and to notify resource information on an assigned data channel to the ONU that has transmitted a communication start request.

In addition to control information transmitted on the control channel and the resource channel, the OLT controller 150 periodically generates a synchronization frame SYC for synchronizing the despreading unit 270 of the ONU that has just started up with a downstream frame in the PON section, and supplies it to multiplexer 170. The synchronization frame SYC includes at the leading part a chip pattern for one period of spreading code h for synchronization, as a fixed pattern. The control channel and resource information channel are shared among all ONUs, and the identification numbers of spreading codes used by the spread-spectrum spreaders 162-*i* and 162-*j* are previously known to all ONUs 2-1 to 2-*k* connected to the OLT 1. Further, spreading code h for synchronization is also previously known to all ONUs 2-1 to 2-*k*.

With the above configuration, the PON interface board 10-1 of the OLT 1 transmits wavelength-division-multiplexed CDMA signals including user data, control information, synchronization information, resource information, and the like on carrier waves having a wavelength range of λ(n1-s) to λ(nk-e) through the trunk optical fibers 700-1. These CDMA signals are branched into the branch optical fibers 710-1 to 710-*k* by the optical splitter 800-1 to reach all ONUs 2-1 to 2-*k*. As described above, since downstream frame transmission from the OLT 1 to the ONUs 2-1 to 2-*k* may be performed by one carrier wavelength, the optical signal transmitting unit 180 includes at least one optical signal transmitter.

FIG. 8 shows the configuration of the ONU downstream interface board (ONU-DIF) 20D. The ONU-DIF 20D is composed of an optical signal receiver 260, a despreading unit 270, and a frame transmission unit 280. The despreading unit 270 includes a plurality of spread-spectrum despreaders 271-1 to 271-*j* which despread a reception signal with respective different spreading codes. Out of the plurality of spread-spectrum despreaders 271-1 to 271-*j*, a specific number of spread-spectrum despreaders having specific spreading codes assigned by the OLT 1, a spread-spectrum despreader 271-*h* for synchronization detection, a spread-spectrum despreader 271-*i* for a resource information channel, and a spread-spectrum despreader 271-*j* for a control information channel are valid (in current use) in each ONU, and the other spread-spectrum despreaders are reserved.

The optical signal receiver 260 receives a CDMA spread signal transmitted from the OLT 1 through the branch optical fiber 710 and the optical interface 22, performs linear addition on all spread signals, and converts them into an electrical signal of a multilevel rectangular wave. In this embodiment, the optical signal receiver 260 is composed of one optical signal receiving device (photodiode: DA).

The electrical signal of a multilevel rectangular wave outputted from the optical signal receiver 260 is inputted in parallel to the plurality of spread-spectrum despreaders 271-1 to 271-*j* in the despreading unit 270. Different spreading codes 1 to j are assigned to these spread-spectrum despreaders. Each spread-spectrum despreader multiplies the multilevel rectangular wave signal supplied from the optical signal receiver 260 by each unique spreading code, and outputs the binary determination result of an integrated value in a period corresponding to a symbol rate, as the symbol value of a data flow corresponding to the spreading code.

Out of the spread-spectrum despreaders 271-1 to 271-*j*, the output of the spread-spectrum despreader 271-*h* having spreading code h for the fixed pattern of a synchronization frame, the frame reproduced by the spread-spectrum despreader 271-*i* having spreading code i for a resource information channel, and the frame reproduced by the spread-spectrum despreader 271-*j* having spreading code j for a control channel are inputted to the ONU controller 250. The ONU controller 250 and the spread-spectrum despreader 271-*h* for synchronization detection perform a timing search, thus optimizing the generation timing of the spreading code of the spread-spectrum despreader 271-*h* to synchronize all the spread-spectrum despreaders 271-1 to 271-*j* to the downstream frame.

The frame transmission unit 280 judges the header information of PON frames composed of symbol sequences reproduced by the spread-spectrum despreaders 271-1 to 271-*j* and discards PON frames addressed to the other stations. Upon receiving a PON frame addressed to this station or having a broadcast address, the frame transmission unit 280 performs header processing, and transfers a control frame to the ONU controller 250 and a user frame to the switch 21. The frame header processing includes, for example, the deletion of a PON header, and the addition/conversion/deletion of a VLAN tag or an MPLS label. The switch 21 transfers each frame received from the frame transmission unit 280 to any subscriber line (including a switch connection line and a LAN connection line) identified in accordance with header information.

The ONU controller 250 stores a carrier wavelength (laser wavelength), a spreading code, and a frame transmission timing assigned by the OLT 1. The OLT controller 150 in each PON interface board 10 in the OLT 1 can assign a plurality of carrier frequencies (laser wavelengths) to a same ONU as necessary and assign a plurality of spreading codes to a same ONU. However, the OLT controller 150 has to manage the unassigned wavelengths and the assigned wavelengths so that the same carrier frequency is not assigned to a plurality of ONUs. In the same manner, the spreading codes are managed so that a spreading code assigned to an ONU is not assigned to another ONU. A management table 153 is used for the management of wavelengths and spreading codes and to store wavelengths and spreading codes having been assigned to the ONUs.

The carrier frequencies (laser wavelengths) and spreading codes assigned to the ONUs are stored, for example, in the management table 153, in association with ONU identifiers. The management table 153 is effective at keeping track of the operating status of the system in either case where a carrier frequency (laser wavelength) and a spreading code are assigned to each ONU in a fixed manner or in a dynamic manner at ONU startup.

Figures 10, 11:
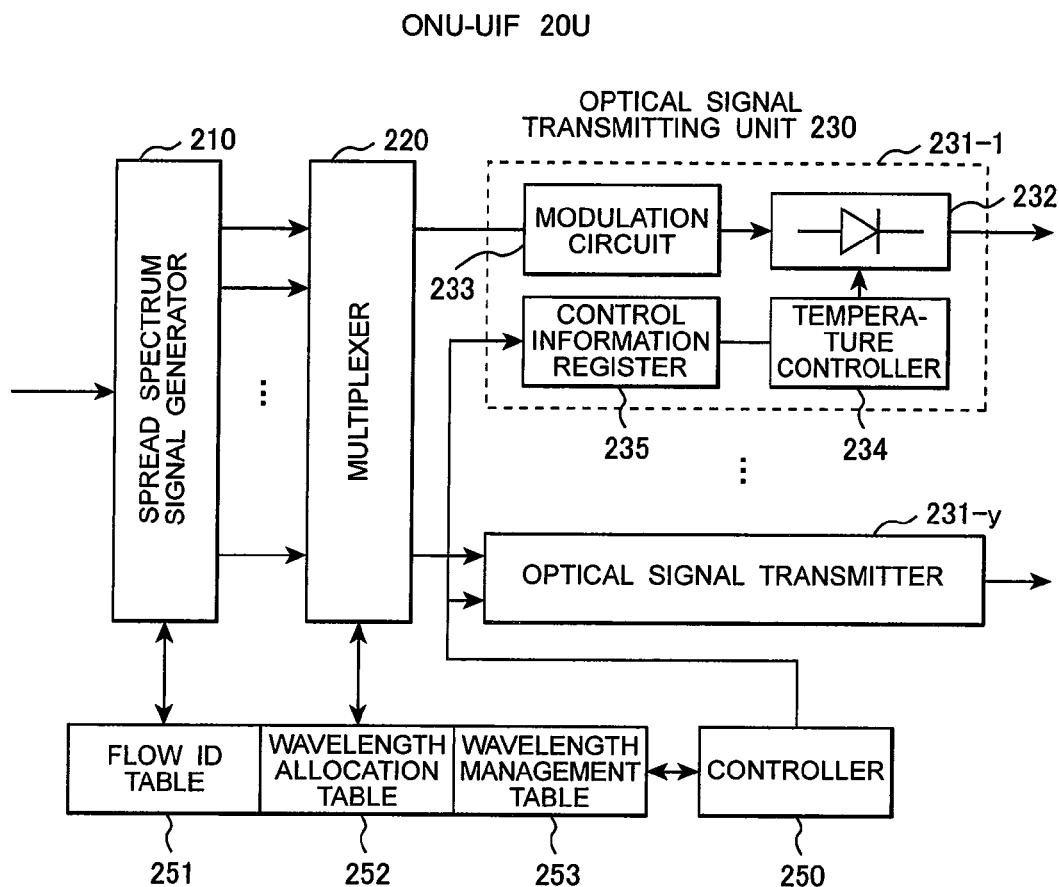
FIG. 10 is a diagram showing an ONU-UIF 20U according to another embodiment.
FIG. 11 is a diagram showing the contents of a wavelength management table 253 provided in a controller 250 in FIG. 10.

FIG. 10 shows an ONU-UIF 20U according to another embodiment.

In this embodiment, the carrier wavelengths of the optical signal transmitters 231 (231-1 to 231-*y*) are controlled by using the temperature dependence of laser beams. However, the oscillation wavelengths of laser devices may be controlled by using parameters other than temperature.

The optical signal transmitter 231 according to this embodiment includes a laser 232, a modulation circuit 233, a temperature controller 234 connected to the laser 232, and a control information register 235. The temperature controller 234 acquires a target temperature from the register 235, and performs automatic control so that the laser operates at the target temperature. Thereby, the laser 232 generates an optical CDMA signal (modulated beam of a spreading signal) with a predetermined wavelength (carrier frequency) determined by the target temperature. The beam is outputted from the laser 232 to the branch optical fiber 710 through the optical interface 22.

Setting control information into each register 235 is performed by the ONU controller 250. This configuration is effective in the case where the OLT 1 specifies a laser wavelength (carrier frequency) usable to the optical signal transmitting unit 230 in each ONU 2. A Wavelength usable to the optical signal transmitting unit 230 is informed from the OLT controller 150. Once a wavelength is specified, the target temperature of a laser is uniquely determined.

Each ONU controller 250 stores a wavelength specified by the OLT controller 150 in a wavelength management table 253, associating it with the identifier (ID) of the optical signal transmitter, and sets the target temperature determined by the wavelength into the register 235 of the optical signal transmitter.

FIG. 11 shows an example of the wavelength management table 253.

The wavelength management table 253 includes a plurality of entries having an optical transmitter ID 2531. A wavelength 2532 specified by the OLT controller 150 is stored in an entry. A frequency in place of the wavelength 2532 may be stored. Once a wavelength is specified, the target temperature of a laser can be uniquely determined by the ONU controller 250. Accordingly, by storing a target temperature 2533 corresponding to a wavelength 2532 in each entry, the ONU controller 250 may successively set target temperatures 2533 into the control information register 235 of an optical signal transmitter indicated by the optical transmitter ID 2531.

Figure 12:
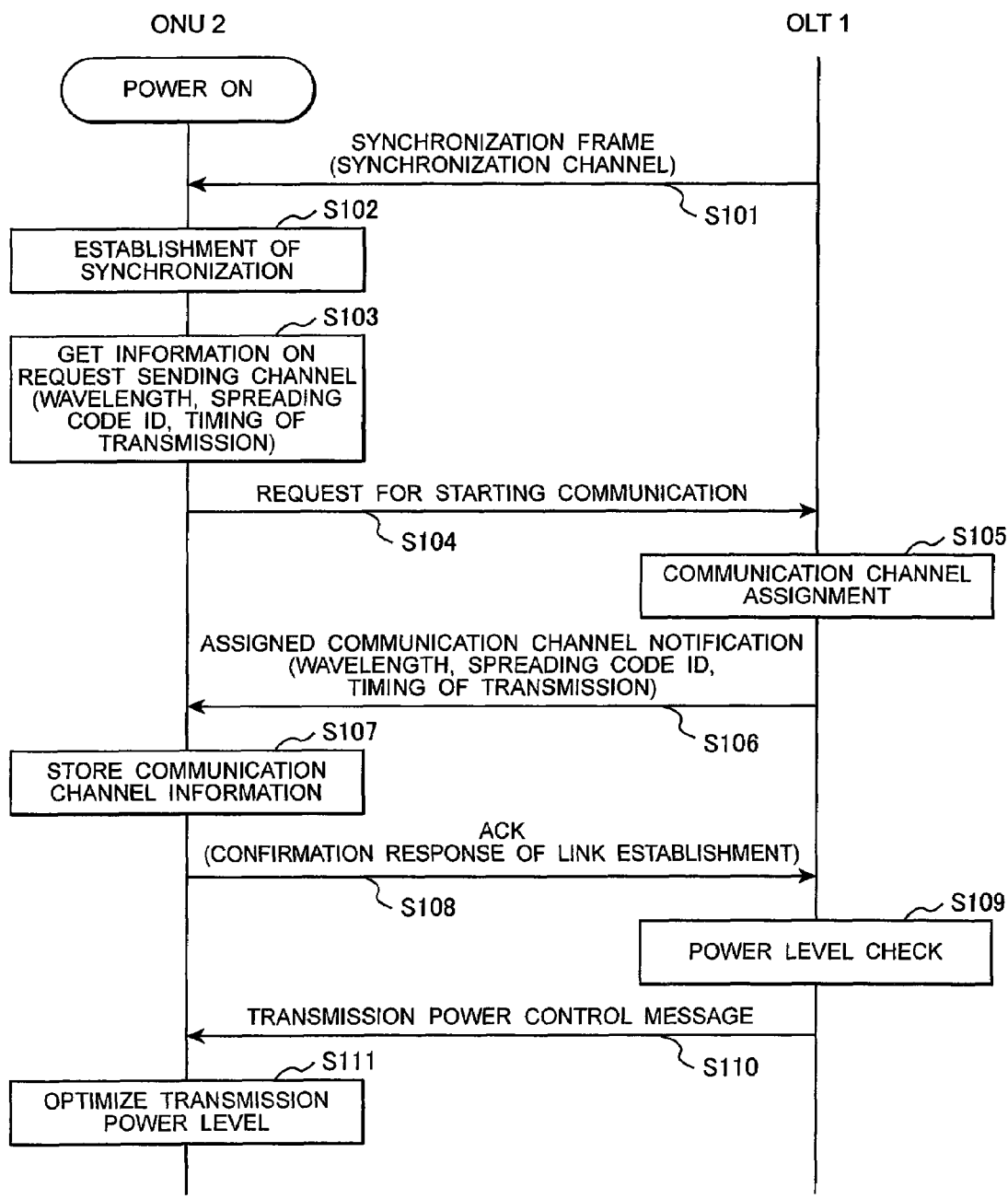
FIG. 12 is a diagram showing an example of a communication sequence performed between the ONU and the OLT at ONU startup.

FIG. 12 shows one embodiment of a communication sequence performed between the ONU 2 and the OLT 1 at ONU startup in the PON system according to the invention.

The OLT 1 transmits a synchronization frame periodically on a synchronization channel to which spreading code h is applied, in parallel to the transmission of a data frame on a downstream data channel.

Figure 13:
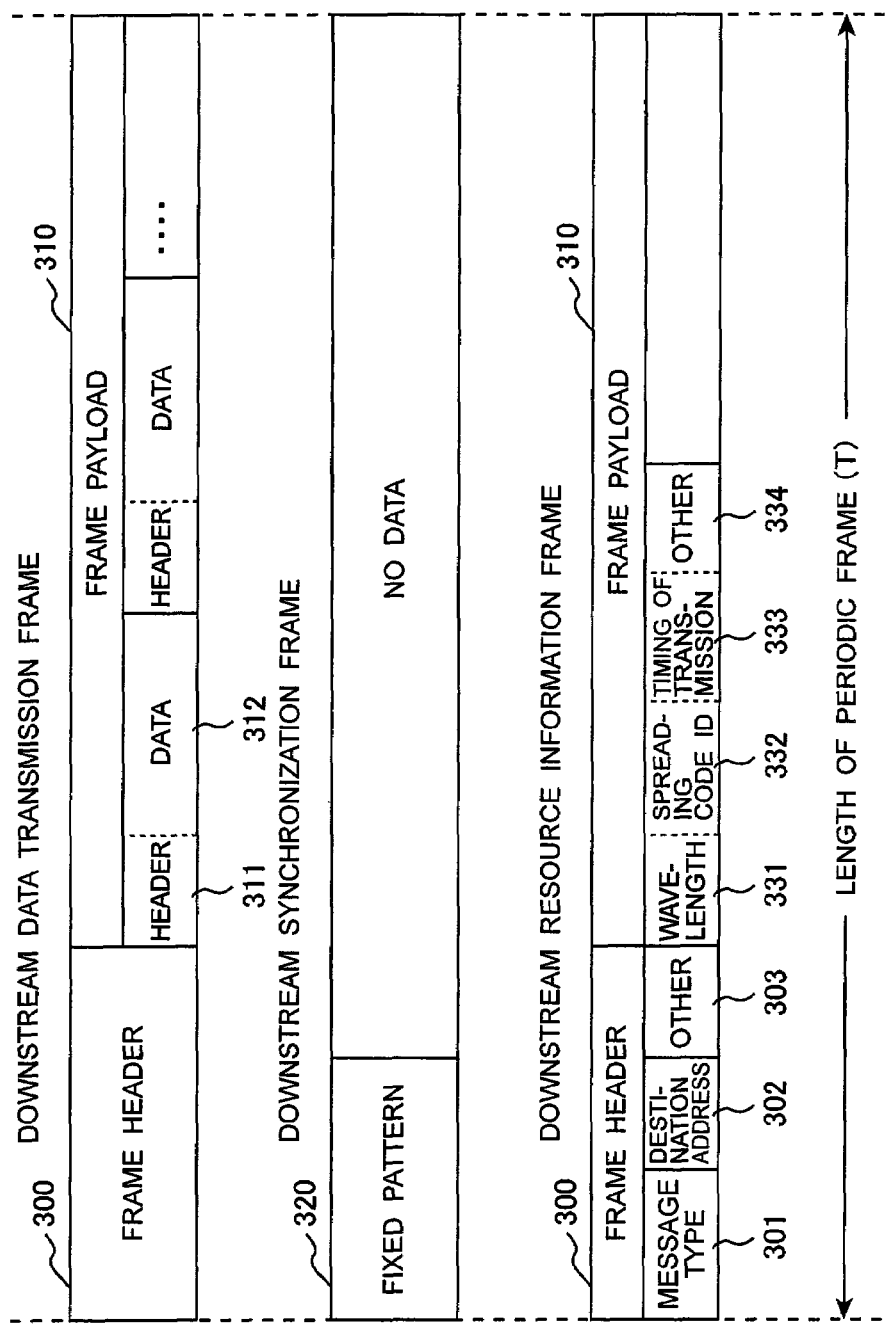
FIG. 13A, FIG. 13B and FIG. 13C show formats of a data frame, a synchronization frame and a resource information frame, respectively, each transmitted from the OLT to the ONU.

A data frame transmitted with frame period T on a downstream data channel is composed of a frame header 300 and a frame payload 310 for example, as shown in FIG. 13A. The frame payload 310 includes a plurality of packets, each packet being composed of a header part 311 and a data part 312.

As shown in FIG. 13B, for example, the synchronization frame includes at the leading part a fixed pattern 320, which varies at a chip rate corresponding to 1 bit time of transmission data, for each frame period T. There is no data in a part other than the fixed pattern part. The fixed pattern 320 corresponds to a chip pattern for one period of spreading code h.

Now, it is assumed that one of the ONUs 2 is activated (power-on) and starts communication with the OLT 1. The ONU controller 250 of the ONU 2 receives a downstream synchronization frame through the spread-spectrum despreader 271-h having spreading code h for synchronization detection (S101), and attempts frame synchronization. While the chip pattern of a despreading code generated in the spread-spectrum despreader 271-h and the fixed pattern 320 transmitted in the synchronization frame are in an asynchronous state, there is no correlation between the fixed pattern 320 inputted to a matched filter and the despreading code. Therefore, the integral value of a matched filter output obtained in the reception duration of the fixed pattern 320 is not greater than a threshold value. In this state, the ONU controller 250 shifts the despreading code on a chip-by-chip basis every period T and repeats despreading of the fixed pattern 320 at the leading part of the synchronization frame, thus making it possible to detect the moment at which the chip pattern of the despreading code and the fixed pattern 320 are synchronized with each other.

Upon detecting the synchronization between the synchronization frame and despreading code h, the ONU controller 250 stops the shift operation of code h and maintains the current generation period of despreading code h. The ONU controller 250 synchronizes the generation timing of the despreading codes in all spread-spectrum despreaders 271-1 to 271-j included in the despreading unit 270 to the spread-spectrum despreader 271-h (establishment of synchronization: S102), selects the output of the spread-spectrum despreader 271-i having the same despreading code as the spreading code of a resource information channel, and acquires channel information (a wavelength, a spreading code number and timing information) on a communication start request sending channel (S103).

A resource information frame composed of a frame header 300 and a frame payload 310 as shown in FIG. 13C is transmitted on the resource information channel. The frame header 300 includes a message type 301, a destination address 302, and other information 303. The frame payload 310 includes a channel resource information block composed of a wavelength 331, a spreading code number 332, transmission timing information 333, and other information 334 of a communication start request sending channel. The message type 301 indicates that this frame is a resource information frame for specifying a communication start request sending channel, and the destination address 302 is a broadcast address which does not designate a specific ONU address.

The ONU controller 250 of the ONU 2 transmits a communication start request to the OLT 1 at a timing specified by the timing information 333, using a spread-spectrum spreader having the spreading code number 332 and an optical signal transmitter having the wavelength 331 specified by the channel resource information block of the resource information frame (S104), and waits for an assigned-communication-channel notification from the OLT.

Upon receiving the communication start request, the OLT controller 150 of the OLT 1 retrieves unassigned carrier wavelength and spreading code number from the wavelength/code management table, and stores the correspondence relationship among the identifier (ONU-ID) of the ONU that has transmitted the communication start request, the carrier wavelength, and the spreading code number into the management table 153 (communication channel assignment: S105).

After that, the OLT controller 150 generates a resource information frame (assigned-channel notification frame) including the channel resource information block specifying the carrier wavelength $\lambda x$, spreading code number x, and transmission timing of an assigned channel, with the ONU-ID as its destination address, and transmits it on the resource information channel (S106). In the communication start request, the ONU may specify a necessary bandwidth so that the OLT 1 assigns a transmission time slot according to the bandwidth required by the ONU and assigns a plurality of carrier wavelengths and spreading code numbers, depending on circumstances.

Upon receiving the resource information frame (assigned-channel notification frame) addressed thereto on the resource information channel, the ONU controller 250 of the ONU 2 stores the assigned carrier wavelength $\lambda x$ and spreading code number x in the wavelength allocation table 252 (S107), and transmits a confirmation response (ACK) of link establishment at the specified transmission timing, using the assigned channel (S108).

Upon receiving the ACK from the ONU 2, the OLT 1 checks the optical power level (S109), and transmits a transmission power control message to the ONU 2, using a control channel (S110). If there is not enough transmission power, the OLT 1 instructs the ONU 2 to change the transmission power with the transmission power control message. When the ONU 2 is instructed to change the transmission power with the transmission power control message, the ONU 2 adjusts the power level of the optical signal transmitter having the carrier wavelength $\lambda x$ (S111).

Figure 14:
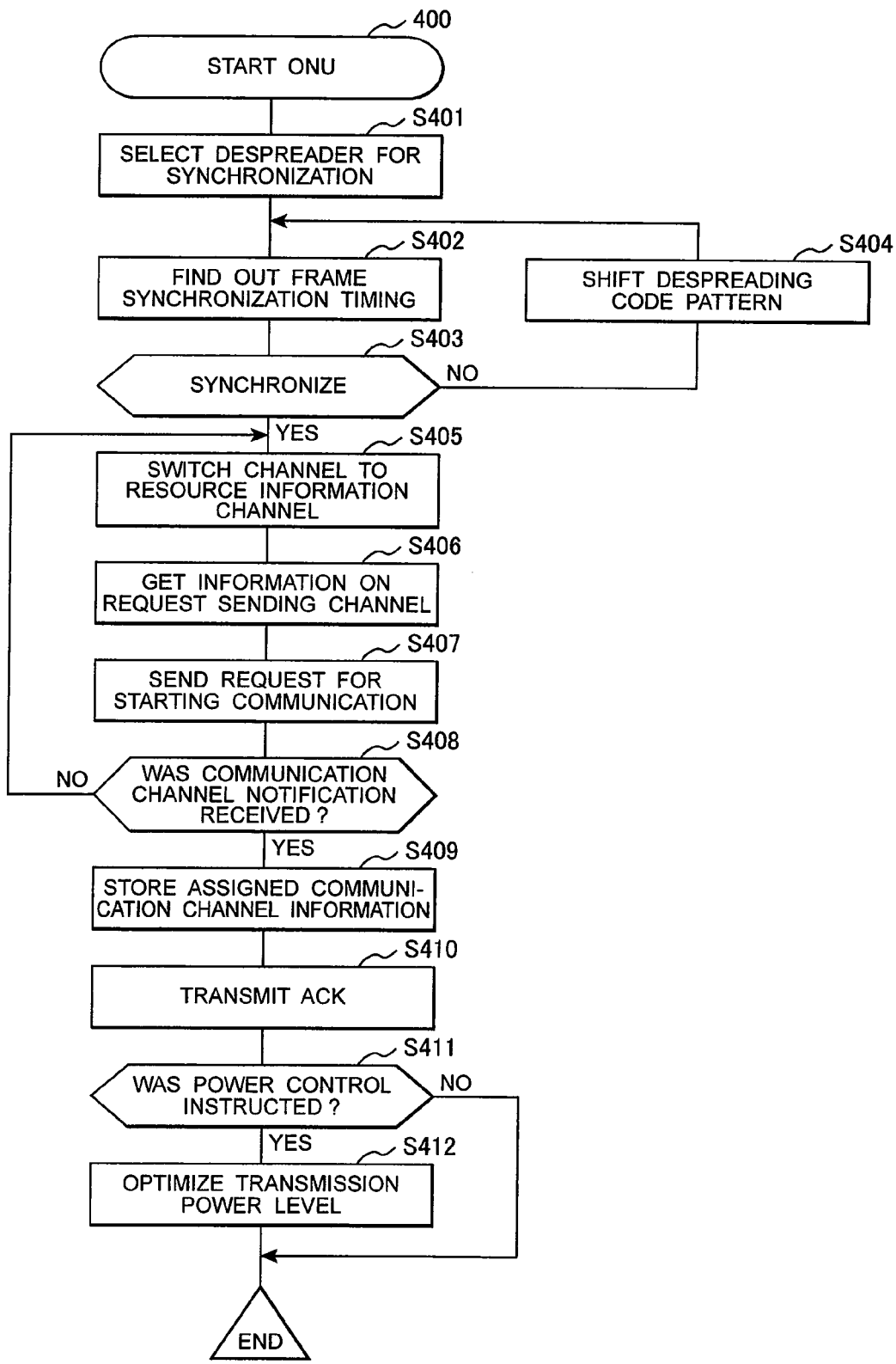
FIG. 14 is a flowchart of a startup routine 400 to be executed by the ONU controller 250 at ONU startup.

FIG. 14 shows a flowchart of a startup routine 400 to be executed by the ONU controller 250 at ONU startup.

The controller 250 selects the known despreader for synchronization (S401), and finds out the synchronization timing of the despreading code (S402). While the fixed pattern received at the head of the synchronization frame and the chip pattern of the despreading code are in an asynchronous state (S403), the controller 250 shifts the despreading code on a chip-by-chip basis every frame period (S404), and repeats a synchronization timing search.

Upon achieving synchronization between the fixed pattern and the despreading code and completing the adjustment of code generation timing of the despreading unit 270 (establishment of synchronization), the controller 250 switches the reception channel to the resource information channel having the known spreading code (S405), and acquires a channel resource information block for a communication start request sending channel from the resource information frame described in FIG. 13C (S406).

The controller 250 transmits a communication start request to the OLT 1 at a specified timing, using an optical signal transmitter and a spread-spectrum spreader having a wavelength and a spreading code number respectively indicated by the channel resource information block (S407), and waits for an assigned-communication-channel notification on the resource information channel (S408). Upon receiving the resource information frame (assigned-channel notification frame) addressed thereto from the OLT 1, the controller 250 stores the assigned carrier wavelength $\lambda x$ and spreading code number x in the wavelength allocation table 252 (S409), and transmits a confirmation response (ACK) of link establishment at the specified transmission timing, using the assigned channel (S410). Then, the controller 250 waits for a transmission power control message on the control channel having the known spreading code j. Upon receiving the transmission power control message, the controller 250 determines whether or not to need to change the transmission power (S411). If the controller 250 is instructed to change the transmission power, the controller 250 adjusts the power of the optical signal transmitter of the assigned channel (S412), and ends the routine.

Figure 15:
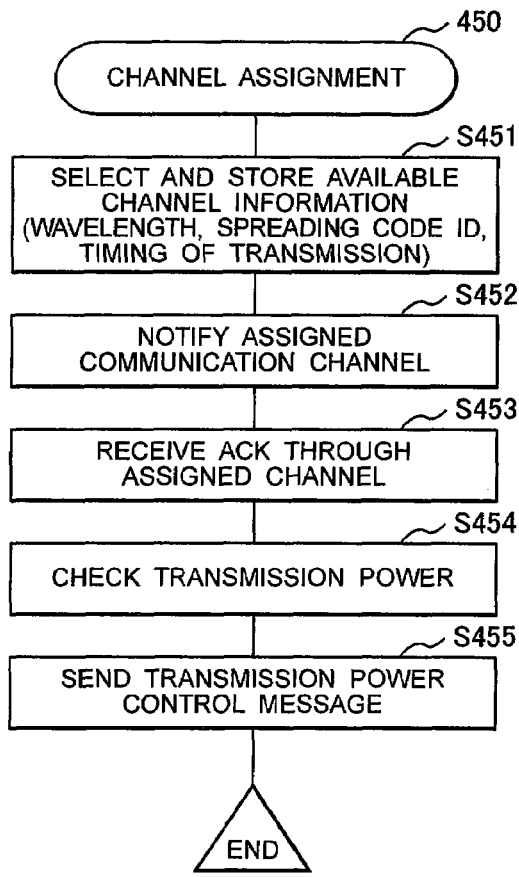
FIG. 15 is a flowchart of a channel assignment routine 450 to be executed by the controller 150 of the OLT at the time of receiving a communication start request from the ONU.

FIG. 15 shows a flowchart of a channel assignment routine 450 to be executed by the OLT controller 150 of the OLT 1 at the time of receiving a communication start request from the ONU 2.

Upon receiving a communication start request on the cannel specified by the resource information frame, the controller 150 selects channel information (wavelength, spreading code number, transmission timing) to be assigned to the ONU that has transmitted the request, and stores it in the management table 153 (S451). Then, the controller 150 transmits the resource information frame (assigned-channel notification frame) to the ONU that has transmitted the request on the resource information channel (S452), and waits for an ACK on the assigned channel.

Upon receiving the ACK from the ONU (S453), the controller 150 checks the transmission power (S454), and transmits a transmission power control frame indicative of a check result to the ONU (S455). The transmission power control frame is transmitted on the control channel using spreading code j. If the transmission power does not fall within an appropriate range, the controller 150 instructs the ONU 2 to change the transmission power with the transmission power control frame.

According to the above-described embodiment, the OLT 1 can assign to an ONU that has been newly added to the PON or an ONU that has resumed from a suspended state, data channel information (wavelength, spreading code number, transmission timing) to be used for upstream data transmission by the ONU.

In the sequence of FIG. 12, the ONU that has achieved frame synchronization receives the resource information frame in which the destination address is a broadcast address, and transmits a communication start request to the OLT 1, using the channel specified by the frame. The OLT 1 having received the communication start request notifies the communication channel assigned to the ONU, using the resource information frame having the destination address indicating the ONU that has transmitted the request.

For example, it is assumed that first the ONU 2-1 is activated and transmits a communication start request and then the ONU 2-2 is activated. Even if the ONU 2-2 receives a resource information frame addressed to the ONU 2-1 on the resource information channel, the ONU 2-2 may wait for a resource information frame including the broadcast address as its destination address. Even while the OLT 1 is executing the assignment of a channel to the ONU 2-1, the ONU 2-2 can transmit a new communication start request on a channel indicated by the broadcast resource information frame. Upon receiving the communication start request from the ONU 2-1, the OLT 1 may set, in a resource information frame to be broadcasted in the next period, channel information different from that in the preceding frame. In this case, the ONU 2-1 and the ONU 2-2 transmit communication start requests to the OLT 1 on different channels.

In the case where two ONUs receive a same resource information frame and transmit communication start requests on a same channel substantially at a same time, crosstalk on the optical fiber caused between the two communication start requests due to the same wavelengths and spreading codes probably prevents the OLT from receiving them normally. In the flowchart shown in FIG. 14, if the ONU cannot receive an assigned-communication-channel notification within a predetermined time after transmitting a communication start request, the ONU reacquires a request sending channel information on the resource information channel and retransmits a communication start request. In order to avoid a collision in the PON section among communication start requests retransmitted from a plurality of ONUs, the ONUs may retransmit communication start requests, for example, with different waiting times in units of frame periods T.

While FIG. 13C shows the resource information frame including one channel resource information block in the frame payload 310, a resource information frame including a plurality of different channel resource information blocks may be broadcasted so that the ONU side can select a use channel randomly. With this, even if two ONUs receive a same resource information frame and transmit communication start requests substantially at a same time, a different use channel for each ONU can prevent the crosstalk between the two communication start requests.

As a modification of the invention, each channel resource information block may specify a plurality of transmission timings so that the ONU side can select a transmission timing randomly. With this, two ONUs receive a same resource information frame and can transmit communication start requests at different transmission timings, thus making it possible to prevent the crosstalk between the two communication start requests transmitted on a same channel.

Figure 16:
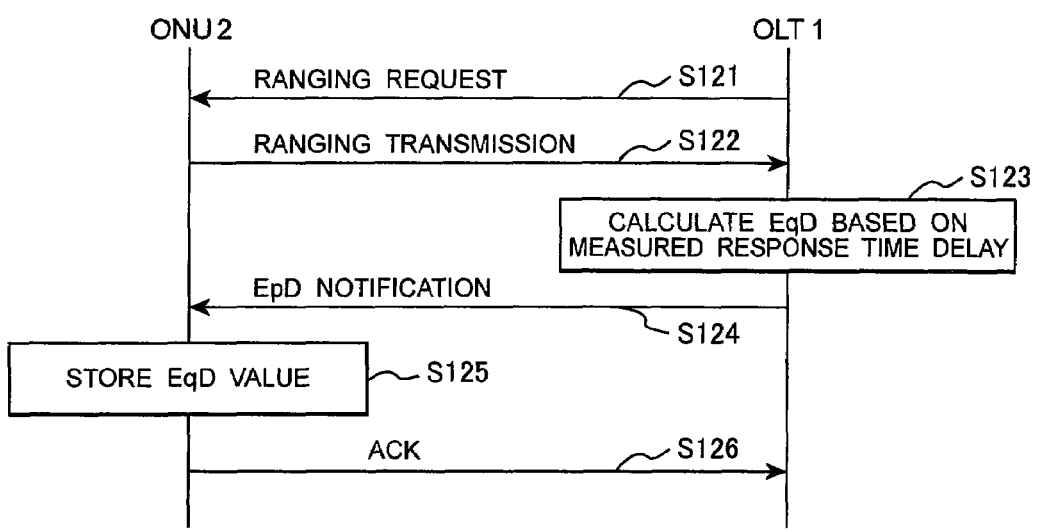
FIG. 16 is a diagram showing a communication sequence for ranging performed between the ONU 2 and the OLT 1.

FIG. 16 shows a communication sequence for ranging performed between the OLT 1 and the ONU 2 after the completion of use channel assignment.

In the PON system, the lengths of branch optical fibers 710 differ among ONUs. Therefore, even if a plurality of ONUs transmit signals at a same time, these signals reach the OLT 1, with different delay times through branch optical fibers having different lengths. In TDMA, each ONU transmits data in a time slot specified by the OLT. In a TDMA-based PON system, ranging is performed in order to prevent a transmission frame from each ONU from overlapping with a transmission frame from another ONU on the trunk optical fiber 700. That is, a signal delay time in the optical fiber section between the OLT and the ONU is measured by ranging, and a transmission start timing in an assigned time slot is adjusted for each ONU in accordance with the signal delay time, so that an upstream frame transmitted from the ONU can reach the OLT within a predetermined time slot.

In the CDMA/WDMA-based PON system to which the invention is applied, since each ONU can use a wavelength and a spreading code different from wavelengths and spreading codes of the other ONUs to transmit upstream data, there is no problem even if a plurality of transmission frames overlap temporally on the optical fiber. However, in the CDMA/WDMA-based PON system, in order that reception signal sequences transmitted from a plurality of ONUs and reproduced by the despreading unit 120 in the OLT are outputted in parallel, being bit-synchronized with each other, it is desired that the timing of a CMA signal transmitted from each ONU can be adjusted bit by bit or chip by chip if possible.

In FIG. 16, the OLT 1 (controller 150) transmits to the ONU 2 a ranging request specifying a timing for a response (S121). The ONU 2 (controller 250) transmits a ranging response (ranging transmission) to the OLT 1 at the specified timing (S122). Upon receiving the response from the ONU 2, the OLT 1 calculates a time lag (EqD) between the specified time and the response reception time (S123), and transmits to the ONU 2 an instruction on delay time correction (adjustment of transmission timing) according to the EqD value (S124). Upon receiving the instruction on delay time correction, the ONU controller 250 stores the specified EqD value (S125), and transmits an ACK to the OLT 1 (S126). Thereafter, at the time of transmitting upstream data to the OLT 1, the ONU controller 250 corrects the transmission timing in accordance with EqD to control data transfer from the R/W controller 2111 to the spread-spectrum spreader 212.

In the case where the OLT 1 cannot receive a response within a predetermined time after transmitting a ranging request or cannot receive an ACK within a predetermined time after transmitting an instruction on delay time correction, the OLT 1 retransmits the ranging request. If an abnormality occurs again, the OLT 1 judges that the ONU is disconnected, makes an abnormal ranging end, and erases control parameters stored in the management table 153.

In the case where each ONU cannot receive a ranging request from the OLT within a predetermined time in a state of readiness for ranging or cannot receive an instruction on delay time correction within a predetermined time after transmitting a ranging response, the ONU makes an abnormal ranging end, returns to the initial state, and for example, reperforms operations from the establishment of synchronization (S102) shown in FIG. 12.

Figure 17:
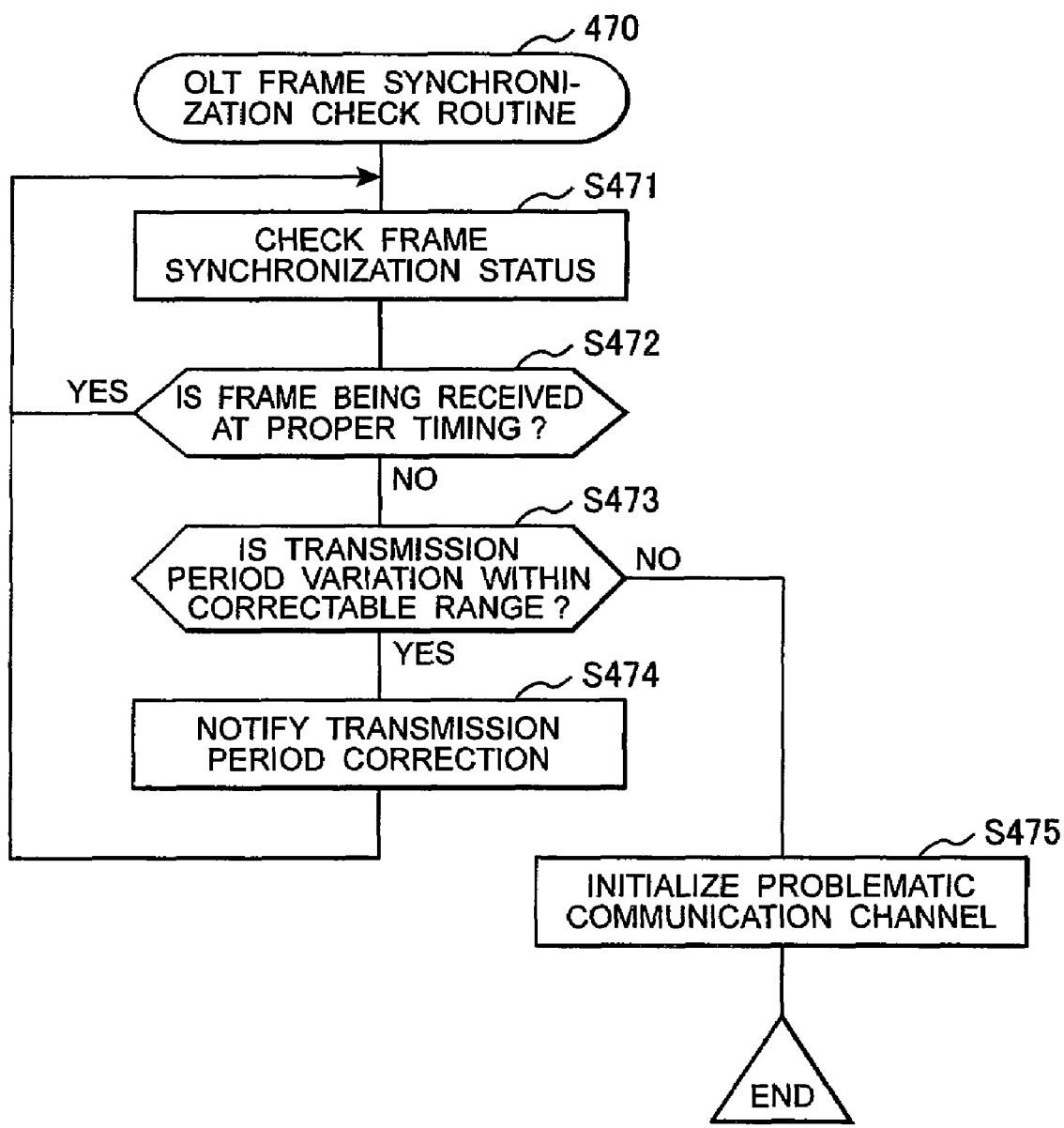
FIG. 17 is a flowchart of a frame synchronization check routine 470 to be executed by the OLT 1 periodically.

FIG. 17 shows a flowchart of a frame synchronization check routine 470 to be executes by the OLT 1 periodically. This routine is used to detect that the period of spreading codes generated in the spread spectrum signal generator 210 has deviated beyond an allowable range during operation of the ONU.

The controller 150 checks a frame synchronization status in the despreading unit 120 during communication with each ONU (S471), and determines whether a transmission frame from the ONU is received at a proper timing (S472). When the phase between a spreading code on the ONU side and a despreading code on the OLT side changes and the frame synchronization begins to deteriorate, the controller 150 determines whether a variation in spreading code period on the ONU side is within a correctable range (S473). If the variation in spreading code period on the ONU side is within the correctable range, the controller 150 instructs the ONU 2 to correct the spreading code period (S474). If the variation in spreading code period on the ONU side is not correctable, the controller 150 initializes the channel to which the spreading code is applied (S475). Upon receiving the instruction for correcting the spreading code period from the OLT 1, the ONU controller 250 makes fine adjustment of the generation timing of the spreading code in the spread spectrum signal generator 210.

What is claimed is:

1. An optical communication system comprising:
a plurality of first apparatuses connected to branch optical fibers branching from a trunk optical fiber; and
a second apparatus connected to the trunk optical fiber, each of said first apparatuses including:
a plurality of spread-spectrum spreaders having different spreading codes;
at least one optical signal transmitter for transmitting to one of said branch optical fibers a CDMA signal generated by spread spectrum by each of said spread-spectrum spreaders as an optical CDMA signal having a carrier wavelength different from carrier wavelengths of the other first apparatuses; and
a first controller,
said second apparatus including:
an optical signal receiver for receiving a wavelength-division-multiplexed optical CDMA signal through the trunk optical fiber;
a plurality of spread-spectrum despreaders having different spreading codes to each other and connected to the optical signal receiver; and a second controller for managing a wavelength and a spreading code to be used for each of said first apparatuses,
wherein the second controller specifies, in response to a request from each of said first controllers, a transmission timing and a wavelength and a spreading code different from that of the other first apparatuses, and
each of said first apparatuses spreads transmission data by the spread-spectrum spreader having the specified spreading code, converts the spread data into an optical signal having the specified wavelength and transmits the optical signal to said branch optical fiber at the specified transmission timing by said optical signal transmitter.

2. An optical communication system comprising:
an office side line terminal apparatus (OLT) connected to a trunk optical fiber; and
a plurality of subscriber connection apparatuses (ONU) each connected to one of branch optical fibers branching from the trunk optical fiber,
each of said ONUs comprising:
an ONU upstream interface and an ONU downstream interface which are connected to one of said branch optical fibers; and
an ONU controller connected to said ONU upstream interface and said ONU downstream interface,
said ONU upstream interface including a plurality of spread-spectrum spreaders with different spreading codes; and at least one optical signal transmitter for transmitting to the branch optical fiber a CDMA signal outputted from one of said spread-spectrum spreaders as an optical CDMA signal having a carrier wavelength specified by said OLT, and
said ONU downstream interface including an optical signal receiver for receiving an optical CDMA signal through said branch optical fiber; and a plurality of spread-spectrum despreaders connected to the optical signal receiver and having different spreading codes to each other,
said OLT comprising:
an OLT upstream interface and an OLT downstream interface which are connected to the trunk optical fiber; and
an OLT controller connected to said OLT upstream interface and said OLT downstream interface,
said OLT upstream interface including an optical signal receiver for receiving a wavelength-division-multiplexed optical CDMA signal through said trunk optical fiber; and a plurality of spread-spectrum despreaders connected to the optical signal receiver and having different spreading codes to each other, and
said OLT downstream interface including a plurality of spread-spectrum spreaders having different spreading codes to each other, and at least one optical signal transmitter for transmitting to said trunk optical fiber a CDMA signal outputted from one of said spread-spectrum spreaders as an optical CDMA signal,
wherein said OLT controller periodically transmits a channel resource information block specifying a carrier wavelength and a spreading code on a first downstream channel to which a spread-spectrum spreader having a first spreading code is applied,
any one of said ONU controllers having received the channel resource information block with a spread-spectrum despreader having the first spreading code transmits a connection request to said OLT, using the carrier wavelength and the spreading code specified by the channel resource information block, said OLT controller receives the connection request with a spread-spectrum despreader having the spreading code specified in the channel resource information block, and transmits on the first channel a new channel resource information block specifying a carrier wavelength and a spreading code for an upstream data channel to the ONU having made the request, and said ONU controller that has made the request transmits data, using the carrier wavelength and the spreading code specified by the new channel resource information block which was addressed thereto and received by the spread-spectrum despreader having the first spreading code.

3. The optical communication system according to claim 2, wherein said OLT controller periodically transmits a synchronization frame having a fixed pattern corresponding to a second spreading code at a leading part; and said ONU controller detects, by receiving said synchronization frame with a spread-spectrum despreader having the second spreading code, a spreading code generation timing at which a chip pattern of the second spreading code to be applied to the spread-spectrum despreader is synchronized with the fixed pattern, and receives said channel resource information block in a state where each spreading code to be applied to each of said spread-spectrum despreaders of the ONU downstream interface is synchronized with the spreading code generation timing.

4. The optical communication system according to claim 2, wherein said OLT controller periodically transmits a channel resource information block specifying a carrier wavelength, a spreading code, and a transmission timing on the first downstream channel; and said ONU controller transmits a connection request to said OLT at the transmission timing specified by the channel resource information block, using the carrier wavelength and the spreading code specified by the channel resource information block.

5. The optical communication system according to claim 2, wherein said OLT controller periodically transmits a channel resource information block specifying a carrier wavelength, a spreading code, and a plurality of transmission timings on the first downstream channel; and said ONU controller transmits a connection request to said OLT at a transmission timing randomly selected from the plurality of transmission timings, using the carrier wavelength and the spreading code specified by the channel resource information block.

6. The optical communication system according to claim 2, wherein said OLT controller periodically transmits a plurality of channel resource information blocks each specifying a carrier wavelength, a spreading code, and a transmission timing on the first downstream channel; and said ONU controller selects one of said channel resource information blocks, and transmits a connection request to said OLT at the transmission timing specified by the channel resource information block, using the carrier wavelength and the spreading code specified by the channel resource information block.

7. The optical communication system according to claim 2, wherein said ONU controller specifies a desired bandwidth with said connection request; and said OLT controller transmits a channel resource information block specifying a carrier wavelength, a spreading code, and an allocated bandwidth to said ONU that has made the request.

8. The optical communication system according to claim 2, wherein said ONU controller specifies a desired bandwidth with said connection request; and said OLT controller transmits a channel resource information block specifying a carrier wavelength and a plurality of spreading codes to said ONU that has made the request.

9. The optical communication system according to claim 2, wherein said ONU controller specifies a desired bandwidth with said connection request; and said OLT controller transmits a channel resource information block specifying a plurality of carrier wavelengths and a plurality of spreading codes to said ONU that has made the request.

10. The optical communication system according to claim 2, wherein said ONU upstream interface includes a plurality of optical signal transmitters having different carrier wavelengths to each other and a signal multiplexer for selectively supplying outputs of said plurality of spread-spectrum spreaders to said plurality of optical signal transmitters, and wherein said signal multiplexer supplies a CDMA signal outputted from the spread-spectrum spreader having the spreading code specified by the channel resource information block to the optical signal transmitter having the carrier wavelength specified by the channel resource information block.

11. The optical communication system according to claim 2, wherein said OLT controller includes a management table for storing, in association with an identifier of each ONU, a carrier wavelength and a spreading code assigned to the ONU.

12. The optical communication system according to claim 2, wherein said ONU upstream interface includes a laser device capable of adjusting an oscillation wavelength as said optical signal transmitter; and said ONU controller controls the laser device so as to adjust an oscillation wavelength to the carrier wavelength specified by the channel resource information block.

13. The optical communication system according to claim 11, wherein said ONU controller has a wavelength allocation table for indicating a correspondence relationship between a spreading code and a carrier wavelength; and said signal multiplexer associates one of said spread-spectrum spreaders with said optical signal transmitter in accordance with the wavelength allocation table.

* * * * *